US012077041B2

(12) United States Patent
Gerding et al.

(10) Patent No.: US 12,077,041 B2
(45) Date of Patent: Sep. 3, 2024

(54) MULTI-SPEED ELECTRIC DRIVE AXLE USING MULTI-LAYSHAFT TRANSMISSION

(71) Applicant: AMERICAN AXLE & MANUFACTURING, INC., Detroit, MI (US)

(72) Inventors: Austin R. Gerding, Shelby Township, MI (US); Jason Bock, Sterling Heights, MI (US); Justin Sieferd, Northville, MI (US); Peter Barta, Farmington, MI (US); Mandar Ahir, Canton, MI (US); Jonathan Trim, Madison Heights, MI (US); Shawn S. Proctor, Farmington Hills, MI (US); Mario Amerla, Macomb, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 18/442,377

(22) Filed: Feb. 15, 2024

(65) Prior Publication Data

US 2024/0181858 A1    Jun. 6, 2024

Related U.S. Application Data

(63) Continuation of application No. PCT/US2023/032865, filed on Sep. 15, 2023.
(Continued)

(51) Int. Cl.
*B60K 17/16* (2006.01)
*B60K 1/00* (2006.01)
(Continued)

(52) U.S. Cl.
CPC ............... *B60K 1/00* (2013.01); *B60K 17/16* (2013.01); *B60K 2001/001* (2013.01);
(Continued)

(58) Field of Classification Search
CPC .... B60K 1/00; B60K 17/16; B60K 2001/001; B60K 17/12; B60K 6/36; F16H 3/02;
(Continued)

(56) References Cited

U.S. PATENT DOCUMENTS

| 8,986,148 B2 | 3/2015 | Downs et al. |
| 9,079,495 B2 | 7/2015 | Valente et al. |

(Continued)

FOREIGN PATENT DOCUMENTS

| CN | 110385983 A | * 10/2019 |
| JP | 2020152364 A | 9/2020 |

(Continued)

OTHER PUBLICATIONS

International Search Report and Written Opinion dated Jan. 24, 2024 from related PCT Application No. PCT/US2023/032865.

*Primary Examiner* — Tinh Dang
(74) *Attorney, Agent, or Firm* — Reising Ethington P.C.

(57) ABSTRACT

An electric drive axle with an electric motor having a motor shaft that is rotatable about an axis, a differential, and a transmission. The transmission transmits rotary power between the motor shaft and the differential. The multi-speed reduction has an input shaft and at least three on-axis gears. The input shaft is rotatably coupled to the motor shaft. Each of the at least three on-axis gears is co-axial with the input shaft and is rotatable relative to the input shaft in at least one of a first speed ratio and a second speed ratio. The input shaft is axially movable along the axis between a first position, in which a first one of the at least three on-axis gears is rotationally coupled to the input shaft, and a second (Continued)

position in which a second one of the at least three on-axis gears is rotationally coupled to the input shaft.

18 Claims, 29 Drawing Sheets

Related U.S. Application Data

(60) Provisional application No. 63/442,471, filed on Feb. 1, 2023, provisional application No. 63/407,007, filed on Sep. 15, 2022.

(51) Int. Cl.
| | | |
|---|---|---|
| *B60K 6/40* | (2007.10) | |
| *B60K 6/48* | (2007.10) | |
| *B60K 6/547* | (2007.10) | |
| *B60K 17/06* | (2006.01) | |
| *F16H 3/02* | (2006.01) | |
| *F16H 3/08* | (2006.01) | |
| *F16H 3/093* | (2006.01) | |
| *B60K 6/36* | (2007.10) | |
| *B60K 17/12* | (2006.01) | |
| *F16H 3/085* | (2006.01) | |
| *F16H 3/095* | (2006.01) | |

(52) U.S. Cl.
CPC ............ *B60K 6/36* (2013.01); *B60K 6/40* (2013.01); *B60K 6/48* (2013.01); *B60K 2006/4825* (2013.01); *B60K 6/547* (2013.01); *B60K 17/06* (2013.01); *B60K 17/12* (2013.01); *F16H 3/02* (2013.01); *F16H 2003/0803* (2013.01); *F16H 2003/0818* (2013.01); *F16H 3/085* (2013.01); *F16H 3/093* (2013.01); *F16H 2003/0931* (2013.01); *F16H 2003/0936* (2013.01); *F16H 2003/0938* (2013.01); *F16H 3/095* (2013.01); *F16H 2200/0034* (2013.01)

(58) Field of Classification Search
CPC .......... F16H 3/085; F16H 3/093; F16H 3/095; F16H 2003/0803; F16H 2003/0818; F16H 2003/0931; F16H 2003/0936; F16H 2003/0938

See application file for complete search history.

(56) References Cited

U.S. PATENT DOCUMENTS

| | | |
|---|---|---|
| 9,302,581 B1 | 4/2016 | Valente |
| 10,112,482 B2 | 10/2018 | Downs |
| 11,273,695 B2 | 3/2022 | Downs |
| 11,293,534 B2 | 4/2022 | Downs et al. |
| 11,863,046 B2 | 1/2024 | Downs et al. |
| 2005/0204842 A1* | 9/2005 | Baldwin ............... F16H 3/097 74/331 |
| 2012/0238395 A1 | 9/2012 | Peura et al. |
| 2013/0303324 A1 | 11/2013 | Valente et al. |
| 2014/0274528 A1 | 9/2014 | Valente et al. |
| 2016/0153558 A1 | 6/2016 | Sten et al. |
| 2018/0126846 A1 | 5/2018 | Kincaid et al. |
| 2019/0263383 A1* | 8/2019 | Ikushima ............... B60K 17/16 |

FOREIGN PATENT DOCUMENTS

| | | | |
|---|---|---|---|
| JP | 2021054350 A * | 4/2021 | ............... B60K 6/36 |
| WO | WO2010099325 A2 | 9/2010 | |
| WO | WO-2020181671 A1 * | 9/2020 | |

\* cited by examiner

MULTI-SPEED ELECTRIC DRIVE AXLE USING MULTI-LAYSHAFT TRANSMISSION

CROSS-REFERENCE TO RELATED APPLICATIONS

This application is a by-pass continuation of International (PCT) Patent Application No. PCT/US2023/032865 filed Sep. 15, 2023, which claims the benefit of U.S. Provisional Application No. 63/442,471 filed on Feb. 1, 2023 and U.S. Provisional Application No. 63/407,007 filed on Sep. 15, 2022. The entire disclosure of each of the above applications is incorporated herein by reference.

FIELD

The present disclosure relates to a multi-speed electric drive axle that uses a multi-layshaft transmission.

BACKGROUND

This section provides background information related to the present disclosure which is not necessarily prior art.

Electric drive axles are becoming increasingly popular in the drivelines of automotive vehicles. There is increasing interest in electric drive axles that employ multi-speed transmissions. One drawback to the such electric drive axles is that heretofore the multi-speed transmission can be difficult to package into a vehicle in such a way that does not impact either cabin space or vehicle clearance. Accordingly, there is a need in the art for an improved electric drive axle having a multi-speed transmission that is relatively compact.

SUMMARY

This section provides a general summary of the disclosure, and is not a comprehensive disclosure of its full scope or all of its features.

In one form, the present disclosure provides an electric drive axle that includes a housing assembly, an electric motor, a differential assembly, and a transmission. The electric motor is coupled to the housing assembly and has a motor shaft that is rotatable about a motor axis. The differential assembly is received in the housing assembly and includes a differential input member, which is rotatable about an output axis, and a pair of differential output members that are rotatable about the output axis. The transmission is received in the housing assembly and transmits rotary power between the motor shaft and the differential input member. The transmission has an input shaft, which is rotatably coupled to the motor shaft and axially movable along the motor axis, a first reduction gearset, a second reduction gearset, and a coupling sleeve. The first reduction gearset has a first intermediate input gear and a first intermediate output gear. The first intermediate output gear is axially slidably and rotatably disposed on the input shaft. The first intermediate output gear is meshingly engaged with the first intermediate input gear and is rotatable about an intermediate axis that is parallel to the motor axis. The second reduction gearset has a second intermediate input gear, a second intermediate output gear, a first intermediate gear, a second intermediate gear, a third intermediate gear and a fourth intermediate gear. The input shaft is rotatable and axially slidable relative to the second intermediate input gear, the third intermediate gear and the fourth intermediate gear. The first intermediate gear is meshingly engaged to the second intermediate input gear. The second intermediate gear is coupled to the first intermediate gear for rotation therewith and is meshingly engaged to the third intermediate gear. The fourth intermediate gear is meshingly engaged to the second intermediate output gear. The coupling sleeve is rotatable about the input shaft but is coupled to the input shaft for translation therewith along the motor axis. The input shaft is movable between a first position, in which the input shaft is rotatably coupled to the first intermediate input gear and the coupling sleeve is rotationally decoupled from at least one of the third intermediate gear and the fourth intermediate gear, and a second position in which the input shaft is rotationally decoupled from the first intermediate input gear, the input shaft is rotationally coupled to the second intermediate input gear, and the coupling sleeve rotationally couples the third and fourth intermediate gears to one another.

In another form, the present disclosure provides an electric drive axle that includes a housing assembly, an electric motor, a differential assembly, and a transmission. The electric motor is coupled to the housing assembly and has a motor shaft that is rotatable about a motor axis. The differential assembly is received in the housing assembly and includes a differential input member, which is rotatable about an output axis, and a pair of differential output members that are rotatable about the output axis. The transmission is received in the housing assembly and transmits rotary power between the motor shaft and the differential input member. The transmission has a multi-speed reduction that includes an input shaft, which is rotatably coupled to the motor shaft and axially movable along the motor axis, a first reduction gearset, a second reduction gearset, and a coupling sleeve. The first reduction gearset has a first intermediate input gear and a first intermediate output gear. The first intermediate output gear is axially slidably and rotatably disposed on the input shaft. The first intermediate output gear is meshingly engaged with the first intermediate input gear and is rotatable about an intermediate axis that is parallel to the motor axis. The second reduction gearset has a second intermediate input gear, a second intermediate output gear, a first intermediate gear and a second intermediate gear. The second intermediate input gear is axially slidably and rotationally coupled to the input shaft. The first intermediate gear is axially slidably and rotatably disposed on the input shaft. The second intermediate gear is axially slidably and rotatably disposed on the input shaft. The second intermediate output gear is meshingly engaged with the second intermediate gear and is coupled to the first intermediate output gear for common rotation about the intermediate axis. The coupling sleeve is rotatably received on but axially fixed to the input shaft. The input shaft is movable between a first position, in which the input shaft is rotatably coupled to the first intermediate input gear and the coupling sleeve is rotationally decoupled from at least one of the first intermediate gear and the second intermediate gear, and a second position in which the input shaft is rotationally decoupled from the first intermediate input gear and the coupling sleeve rotationally couples the first and second intermediate gears to one another.

In still another form, the present disclosure provides an electric drive axle that includes a housing assembly, an electric motor, a differential assembly, and a transmission. The electric motor coupled to the housing assembly and has a motor shaft that is rotatable about a motor axis. The differential assembly is received in the housing assembly and includes a differential input member, which is rotatable about an output axis, and a pair of differential output members that are rotatable about the output axis. The transmission is received in the housing assembly and transmits rotary power between the motor shaft and the differential input member. The transmission has a multi-speed reduction that is selectively operable in a first speed ratio and a second speed ratio. The multi-speed reduction has an input shaft and at least three on-axis gears. The input shaft is rotatably coupled to the motor shaft. Each of the at least three on-axis gears is co-axial with the input shaft and is rotatable relative to the input shaft in at least one of the first and second speed ratios. The input shaft is axially movable along the motor axis between a first position, in which a first one of the at least three on-axis gears is rotationally coupled to the input shaft, and a second position in which a second one of the at least three on-axis gears is rotationally coupled to the input shaft.

In yet another form, the present disclosure provides an electric drive axle that includes a housing assembly, an electric motor, a differential assembly, a mounting plate, a transmission, a first bearing and a second bearing. The housing assembly has a housing member that defines a first bearing mount. The electric motor coupled to the housing assembly and has a motor shaft that is rotatable about a motor axis. The differential assembly is received in the housing assembly and includes a differential input member, which is rotatable about an output axis, and a pair of differential output members that are rotatable about the output axis. The mounting plate is coupled to the housing assembly and defines a second bearing mount. The transmission is received in the housing assembly and transmits rotary power between the motor shaft and the differential input member. The transmission has a compound gear that includes a layshaft, a first intermediate gear and a second intermediate gear that are coupled to one another for common rotation about an intermediate axis. The first bearing received in the first bearing mount and supports a first end of the layshaft for rotation about the intermediate axis relative to the housing member. The second bearing is mounted in the second bearing mount and supports a second end of the layshaft for rotation about the intermediate axis relative to the mounting plate. A lubrication gallery is formed in the mounting plate. The lubrication gallery is in fluid communication with the first and second bearing mounts.

In still another form, the present disclosure provides an electric drive axle that includes a housing assembly, a transmission, and a park-lock mechanism. The housing assembly has first and second housing members that cooperate to define a transmission cavity therebetween. The second housing member defines a second mount and a pivot pin aperture. The transmission is received in the transmission cavity. The transmission has a gear that is supported by a bearing that is received in the bearing mount. The park-lock mechanism includes a park-lock gear, which is coupled for rotation with an element of the transmission, a pivot pin, a park pawl, a spring, and a park-lock plunger assembly. The pivot pin is received in the pivot pin aperture and is rotatable relative to the second housing member about a pivot axis. The park pawl is coupled to the pivot pin for common rotation the pivot axis between an engaged position, in which the park pawl is engaged to the park-lock gear, and a disengaged position in which the park pawl is disengaged from the park-lock gear. The spring biases the park pawl out of engagement with the park-lock gear. The park-lock plunger assembly has an input member, a plunger, and a compliance spring. The input member is disposed along an actuation axis. The plunger is slidably disposed on the input member and is movable along the actuation axis between a first position and a second position. The actuation axis is parallel to the pivot axis. Movement of the plunger from the first position toward the second position causes corresponding motion of the park pawl toward the engaged position. Placement of the plunger in the second position permits the spring to move the park pawl into the disengaged position. The compliance spring is disposed coaxially on the input member and biases a head of the input member apart from the plunger.

In yet another form, the present disclosure provides a method for assembling an electric drive axle. The method includes: providing a first housing member; assembling a transmission into the first housing member, the transmission including a gear supported on a bearing; providing a second housing member, the second housing member defining a bearing mount; installing a park-lock mechanism to the second housing member, the park-lock mechanism has a park-lock gear, a pivot pin, a park pawl, a spring, and a park-lock plunger assembly, the park-lock gear is coupled for rotation with an element of the transmission, the pivot pin is received in the pivot pin aperture and is rotatable relative to the second housing member about a pivot axis, the park pawl is coupled to the pivot pin for common rotation the pivot axis between an engaged position, in which the park pawl is engaged to the park-lock gear, and a disengaged position in which the park pawl is disengaged from the park-lock gear, the spring biasing the park pawl out of engagement with the park-lock gear, the park-lock plunger assembly has an input member, a plunger, and a compliance spring, the input member is disposed along an actuation axis, the plunger is slidably disposed on the input member and movable along the actuation axis between a first position and a second position, the actuation axis is parallel to the pivot axis the plunger, wherein movement of the plunger from the first position toward the second position causes corresponding motion of the park pawl toward the engaged position, and wherein placement of the plunger in the second position permits the spring to move the park pawl into the disengaged position, the compliance spring disposed coaxially on the input member and biasing a head of the input member apart from the plunger; and assembling the second housing member to the first housing member to install the bearing into the bearing mount and to enclose the transmission, the park-lock gear, the pivot pin, the park pawl and the plunger assembly within a housing assembly that is formed by the first and second housing members.

In a further form, the present disclosure provides a vehicle driveline component that includes a housing assembly, a multi-speed reduction, which is received in the housing assembly, and an actuator assembly. The multi-speed reduction has a movable element that is movable along a shift axis between a first position and a second position. Placement of the movable element in the first position causes the multi-speed reduction to operate in a first speed reduction ratio, while placement of the movable element in the second position causes the multi-speed reduction to operate in a second speed reduction ratio that is different from the first speed reduction ratio. The actuator assembly has an actuator motor, a screw, an actuator output member, a coupler and at least one coupler pad. The screw is driven by the actuator motor about a screw axis that is parallel to the shift axis. The actuator output member has a first end and a second end that is opposite the first end. The movable element of the multi-speed reduction is axially fixed but rotatable relative to the first end of the axially movable member. The second end of the axially movable member defines a pocket. The coupler is threadably coupled to the screw and is received into the pocket. Each of the at least one coupler pads is received in the pocket and is mounted to one of the coupler and the axially movable member. Each of the at least one coupler pads has a first surface, which abuts an associated surface of the axially movable member, and a second surface that abuts an associated surface of the coupler. The second surface of each of the at least one coupler pads is curved so that contact between the coupler and each of the at least one coupler pads occurs over an associated line that extends in a plane that includes the screw axis.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
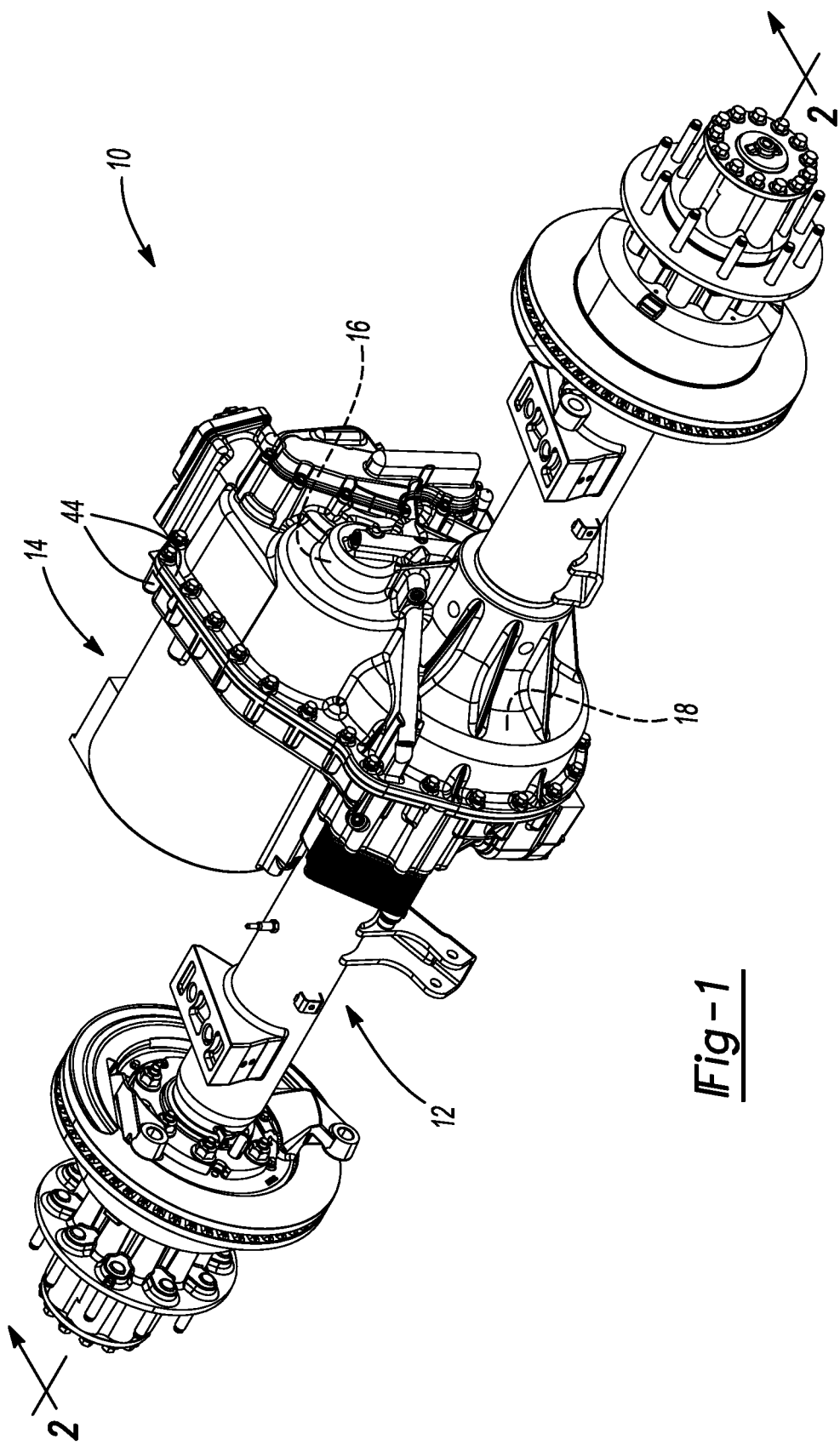
FIG. 1 is a perspective view of an exemplary electric drive axle constructed in accordance with the teachings of the present disclosure.
Figure 2:
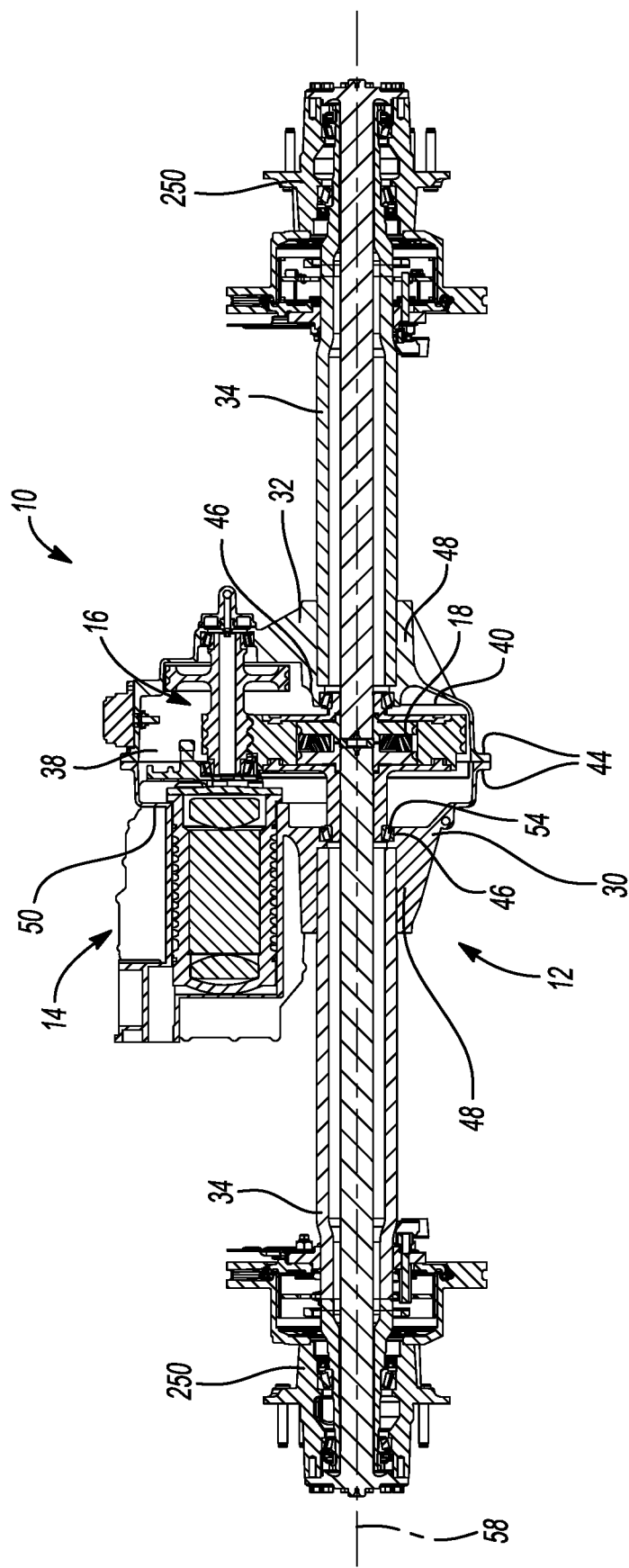
FIG. 2 is a section view taken along the line 2-2 of FIG. 1.

With reference to FIGS. 1 and 2, an exemplary electric drive axle constructed in accordance with the teachings of the present disclosure is generally indicated by reference numeral 10. The multi-speed electric drive axle 10 includes several major assemblies or components including a housing assembly 12, an electric motor 14, a transmission 16, a differential assembly 18 and a pair of axle shafts 20.

Figure 3:
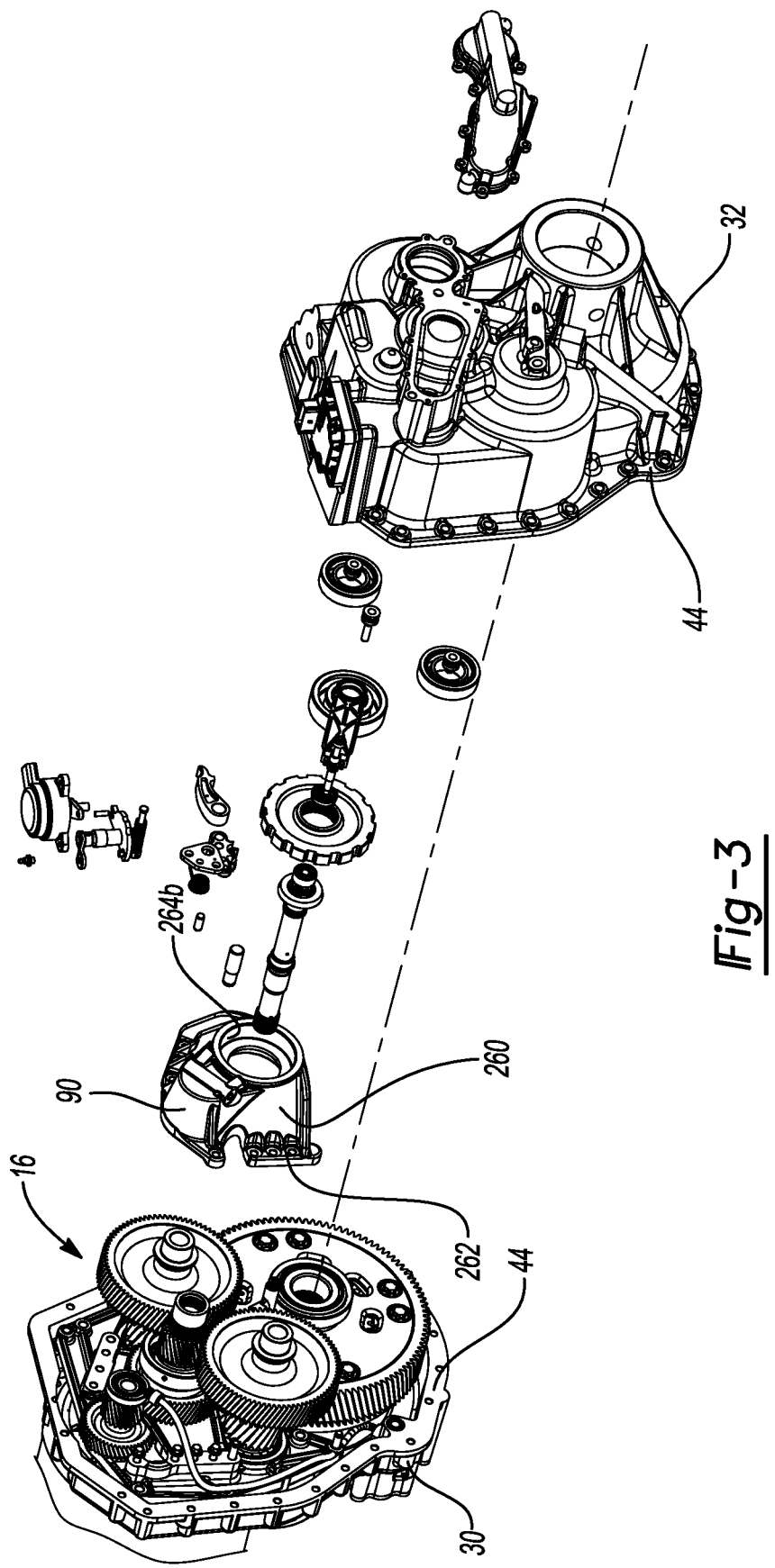
FIG. 3 is an exploded perspective view of a portion of the electric drive axle of FIG. 1 illustrating a gearcase of a housing assembly, a transmission and a differential assembly in more detail.

With specific reference to FIGS. 2 and 3, the housing assembly 12 of the example provided includes first and second housing members 30 and 32, respectively, and a pair of axle tubes 34 in which the axle shafts 20 are rotatably disposed. The housing assembly 12 is configured to handle beaming loads, and as such, provides the multi-speed electric drive axle 10 with a "beam" or "rigid" axle configuration. It will be appreciated, however, that the housing assembly 12 could be configured differently, for example to configure the multi-speed electric drive axle 10 for use with an independent suspension.

The first and second housing members 30 and 32 have a "clam shell" configuration and cooperate to form a carrier housing that defines a gearcase that has a transmission cavity 38 and a differential cavity 40 that intersects the differential cavity 40. Each of the first and second housing members 30 and 32 can define a coupling flange 44, a differential bearing mount 46, and an axle tube mount 48. The first housing member 30 can additionally include a motor mount 50. The coupling flanges 44 can be abutted against one another and threaded fasteners can be employed to secure the coupling flanges 44 to one another. A gasket or sealant (not shown) can be disposed between the first and second housing members 30 and 32 (e.g., contacting the adjacent faces of the coupling flanges 44) so that the first and second housing members 30 and 32 are additionally sealingly coupled to one another. Each differential bearing mount 46 is formed into an in-board side of an associated one of the first and second housing members 30 and 32 and is configured to receive a differential bearing 54 therein that supports the differential assembly 18 for rotation about an output axis 58. Each axle tube mount 48 defines an axle tube aperture that is configured to receive therein an associated one of the axle tubes 34.

Each of the axle tubes 34 can be received into an associated one of the axle tube apertures and can be fixedly coupled to an associated one of the axle tube mounts 48 in any desired manner. In the example shown, the axle tubes 34 are press-fit into the axle tube apertures and conventional weld slugs (not specifically shown) are employed to inhibit both axial and rotational movement of the axle tubes 34 along or about the output axis 58 relative to the first and second housing members 30 and 32.

Figure 4:
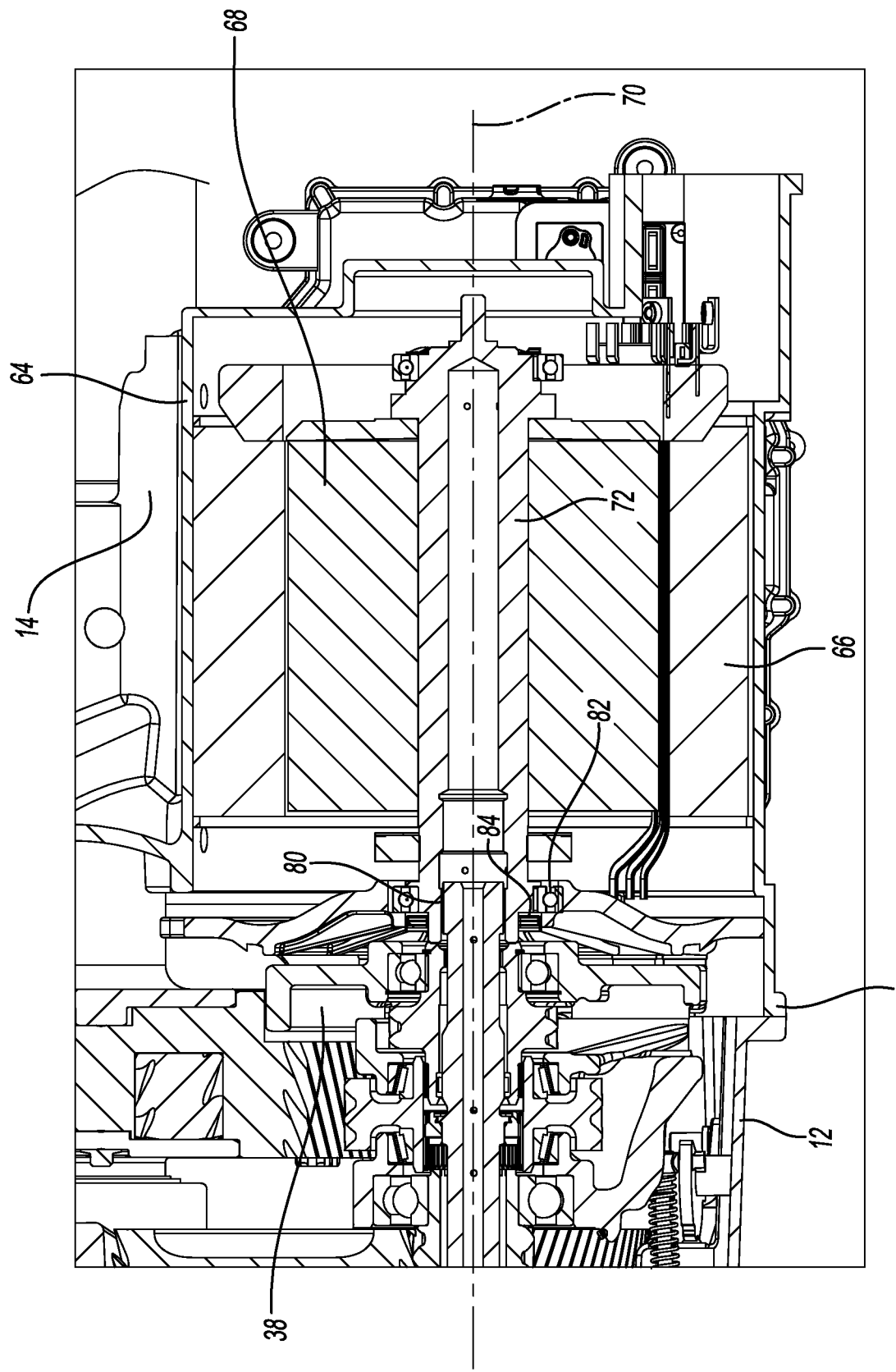
FIG. 4 is a section view of a portion of the electric drive axle of FIG. 1 taken through a motor axis of an electric motor.

With reference to FIG. 4, the electric motor 14 can be configured as any type of electric motor and includes a motor housing 64, a stator 66, which is received into and fixedly coupled to the motor housing 64, a rotor 68, which is received in the stator 66 and rotatable relative to the stator 66 about a motor axis 70, and a motor output shaft 72 that is fixedly coupled to the rotor 68. The motor housing 64 can define a motor bearing mount (not specifically shown) and a seal mount. The motor output shaft 72 can extend along the motor axis 70 through the motor housing 64 and optionally into the transmission cavity 38 in the housing assembly 12. The motor output shaft 72 can be hollow and can define a plurality of first internal spline teeth 80. A motor bearing 82 can be received between the motor housing 64 and the motor output shaft 72 and can support the motor output shaft 72 for rotation about the motor axis 70 relative to the motor housing 64. A rotary shaft seal 84 can be mounted on the seal mount and can form a seal between the motor housing 64 and the motor output shaft 72 that inhibits fluid transmission through a motor shaft aperture in the motor housing 64 between the transmission cavity 38 and the interior of the motor housing 64. Fasteners (not specifically shown) can be employed to fixedly couple the motor housing 64 to the motor mount 50 on the first housing member 30. Alternatively, the motor housing 64 could be unitarily and integrally formed with the first housing member 30. The motor output shaft 72 can extend through or be disposed in-line with the motor shaft aperture.

Figure 5:
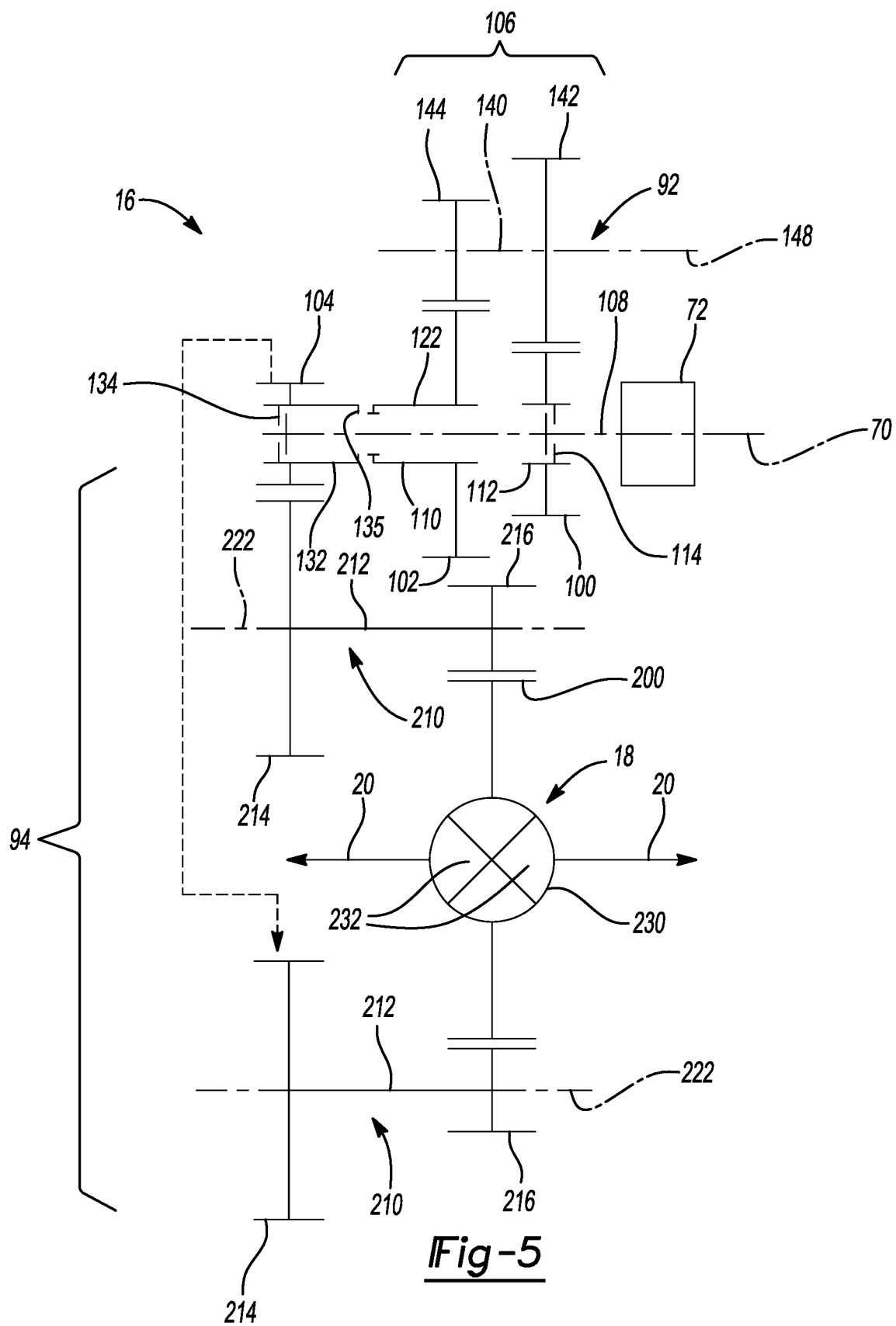
FIG. 5 is a schematic illustration of a portion of the electric drive axle of FIG. 1 that illustrates the transmission in more detail.
Figure 6:
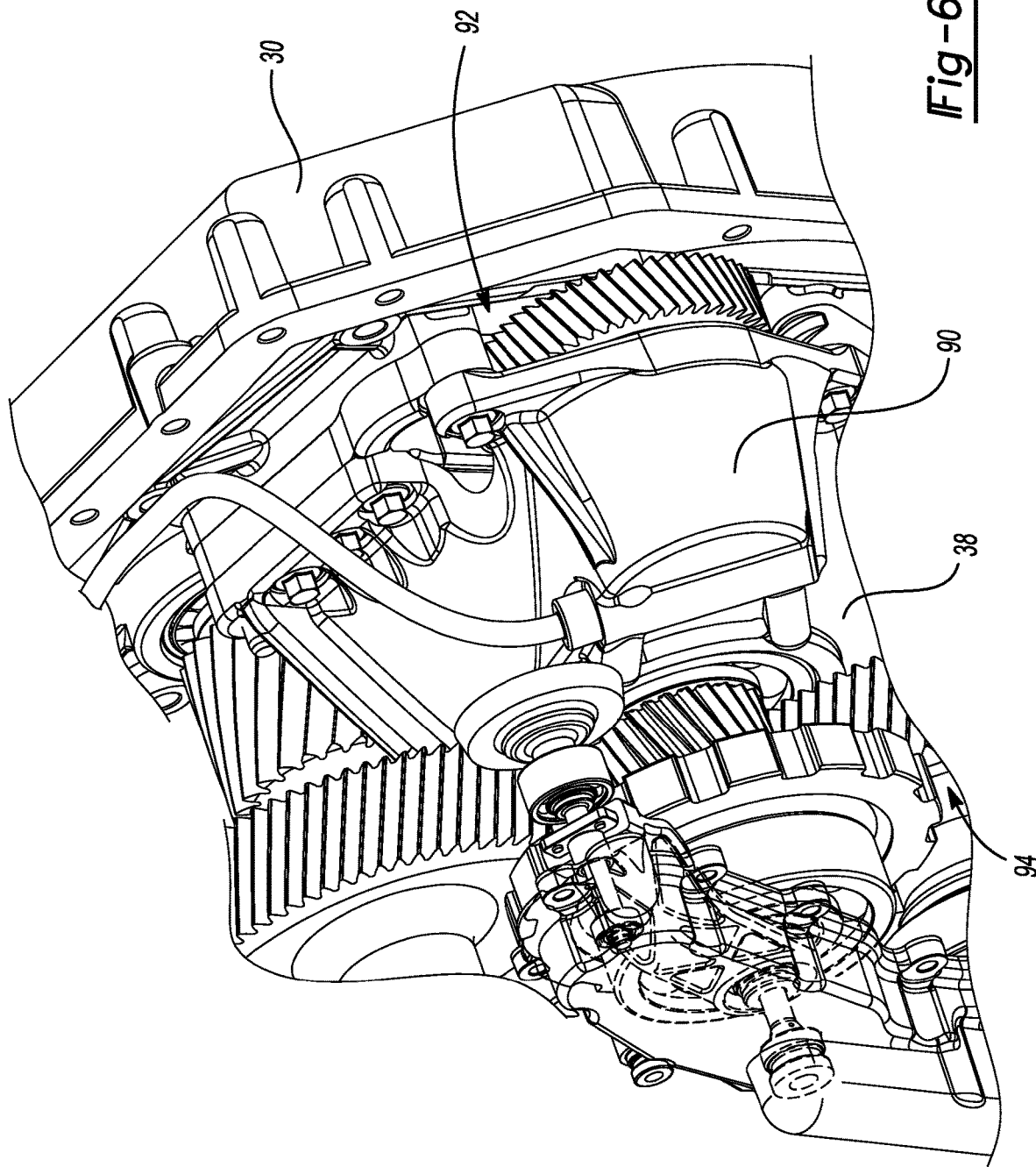
FIG. 6 is a perspective view of a portion of the electric drive axle of FIG. 1 illustrating the transmission in more detail.

As shown in FIGS. 5 and 6, the transmission 16 in the example provided is a multi-speed transmission, but it will be understood that the transmission 16 can be any type of transmission, including a single-speed transmission. The particular transmission 16 shown includes a mounting plate 90, a multi-speed input portion 92 and a single-speed output portion 94. The mounting plate 90 will be described in more detail below, but it will suffice for now that it is received in the transmission cavity 38, that it is fixedly coupled to the first housing member 30 and that a significant portion of the multi-speed input portion 92 is disposed between the first housing member 30 and the mounting plate 90.

Figure 7:
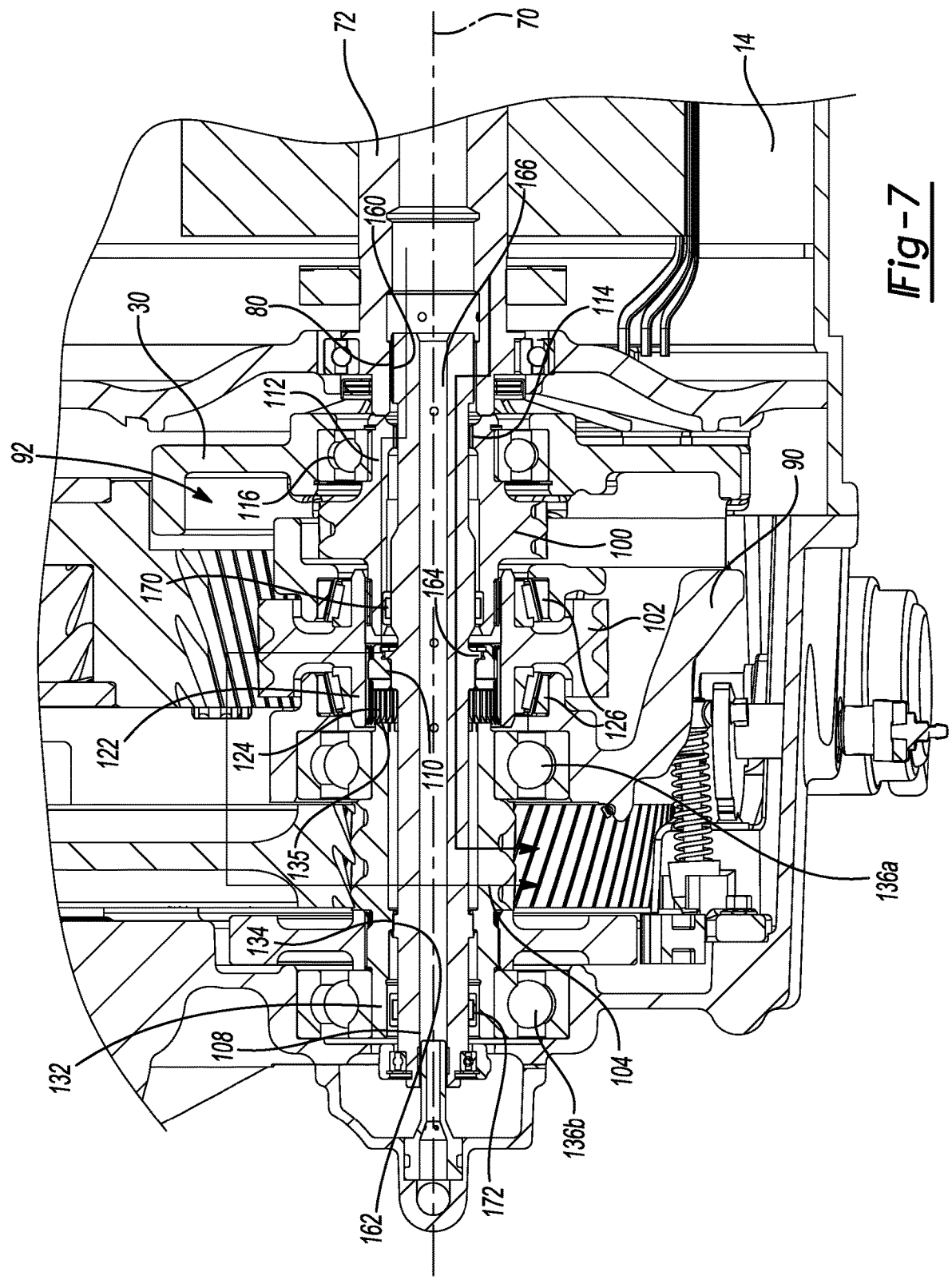
FIG. 7 is a section view of a portion of the transmission taken along the motor axis.

With reference to FIGS. 5 and 7, the multi-speed input portion 92 includes a first gear 100, a second gear 102, a third gear 104, a first compound gear 106, an input shaft 108 and a coupling sleeve 110. The first gear 100 can have gear teeth with a helical gear tooth form that is disposed about a first gear hub 112. The first gear hub 112 is hollow and can define a plurality of second internal spline teeth 114. A bearing 116 is mounted between the first housing member 30 and the first gear hub 112 and supports the first gear 100 for rotation about the motor axis 70. The second gear 102 can have gear teeth with a helical gear tooth form that is disposed about a second gear hub 122. The second gear hub 122 is hollow and can define a plurality of third internal spline teeth 124. A pair of bearings 126 are mounted between the mounting plate 90 and the second gear hub 122 and support the second gear 102 both axially along and radially about the motor axis 70. The first gear 100 is disposed along the motor axis 70 between the motor output shaft 72 and the second gear 102. Optionally, a portion of the first gear hub 112 can be received concentrically within a portion of the second gear hub 122.

The third gear 104 can have gear teeth with a helical gear tooth form that is disposed about a third gear hub 132. The third gear hub 132 is hollow and can define a plurality of fourth internal spline teeth 134 and a plurality of first face teeth 135 that are formed onto or into an axial end face of the third gear hub 132 that faces or is proximate the second gear 102. Bearings 136a and 136b are employed to rotationally support the third gear 104 for rotation about the motor axis 70. The bearing 136a is mounted between the mounting plate 90 and the third gear hub 132 proximate the second gear 102, while the bearing 136b is mounted between the gearcase and the third gear hub 132 on an axial end of third gear 104 that is opposite the bearing 136a.

Figure 8:
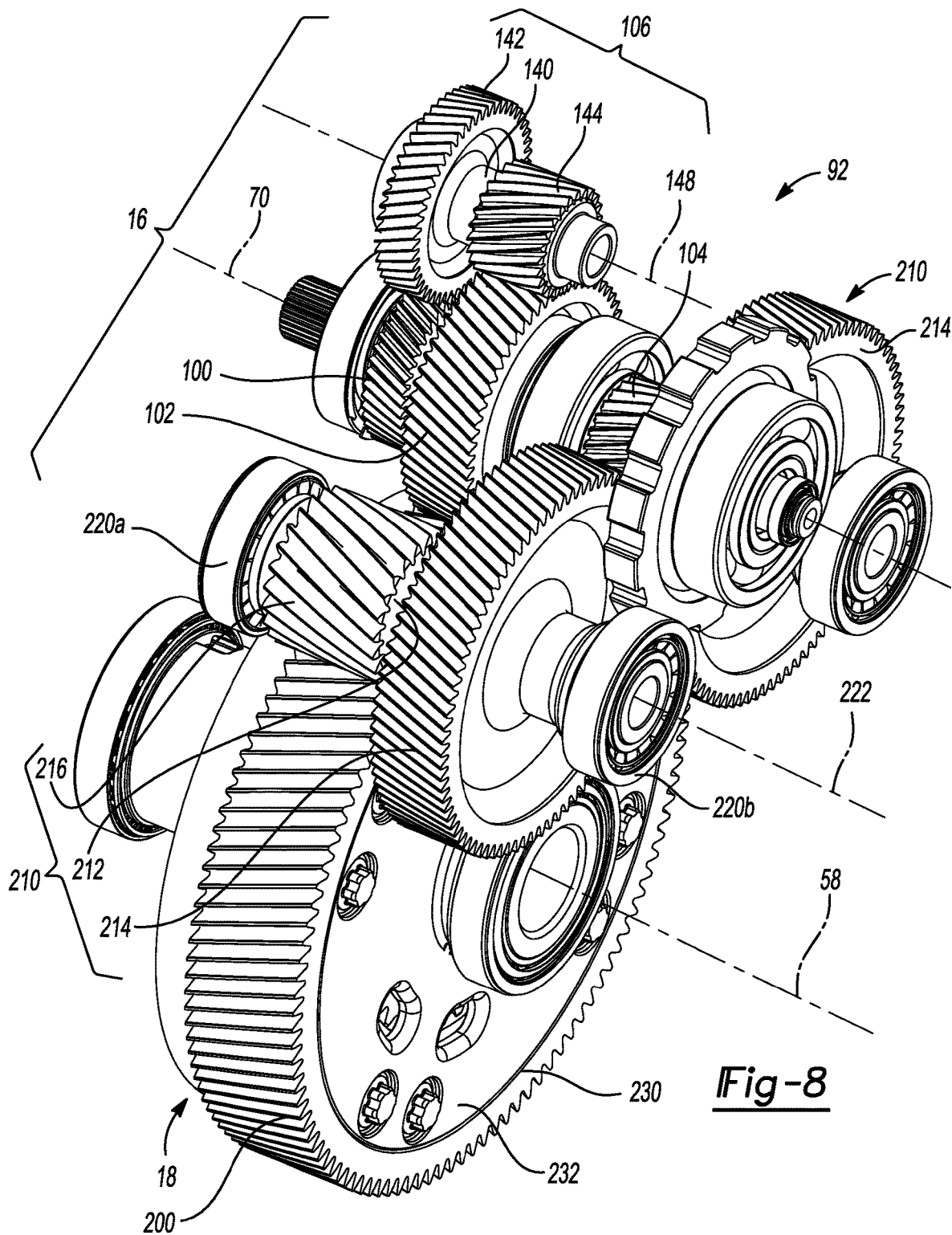
FIG. 8 is a perspective view of the transmission.
Figure 9:
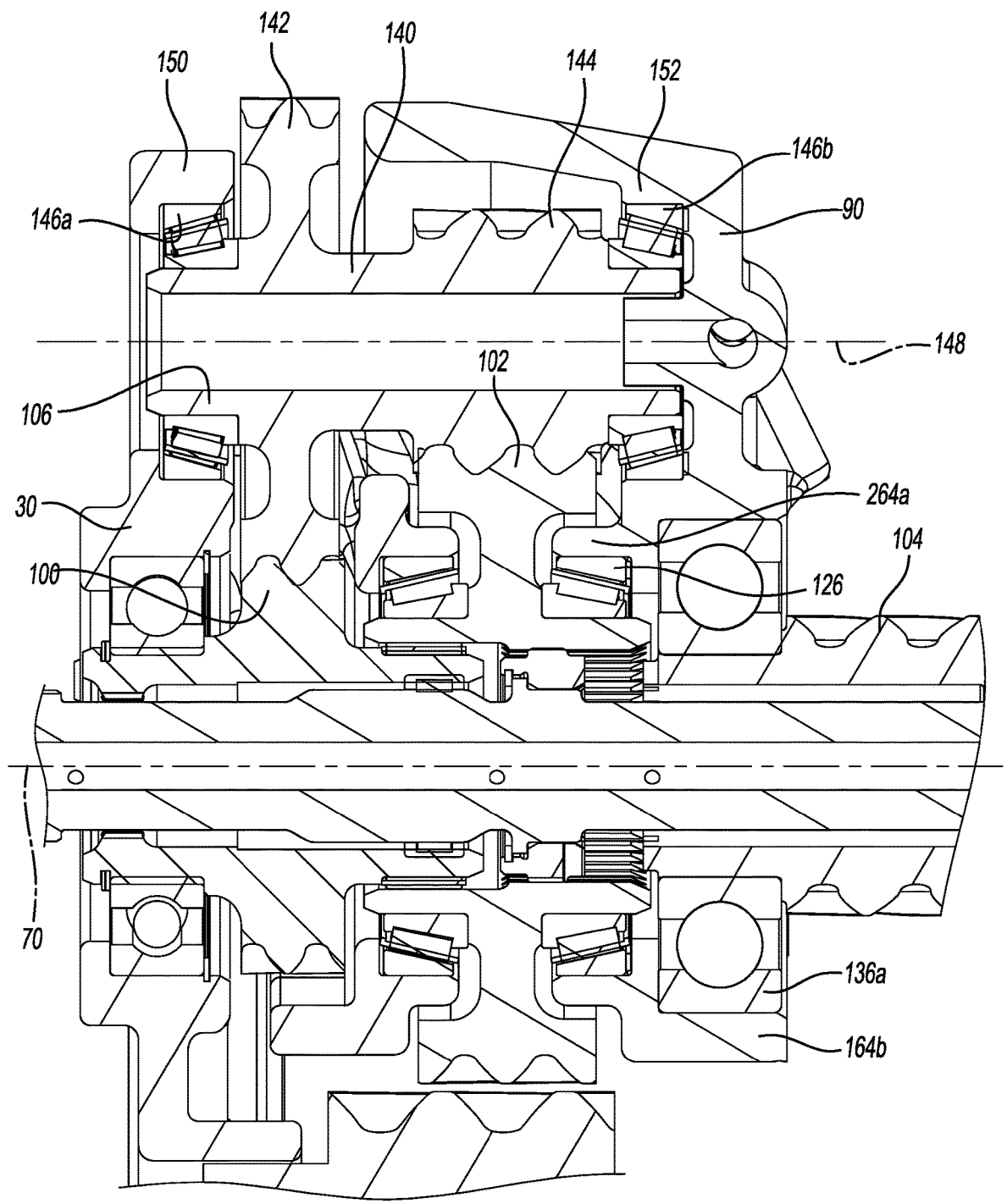
FIG. 9 is a section view taken of a portion of the transmission taken through the motor axis and an intermediate axis of a first compound gear.

With reference to FIGS. 5, 8 and 9, the first compound gear 106 includes a first layshaft 140, a first intermediate gear 142 and a second intermediate gear 144. The first layshaft 140 can be hollow and can be supported on opposite sides by first and second bearings 146a and 146b, respectively, for rotation about a respective first intermediate axis 148 that is parallel to but offset from (i.e., not coincident with) the motor axis 70. The first bearing 146a can be disposed between a first intermediate bearing mount 150 that is formed by the first housing member 30, and a first end of the first layshaft 140, while the second bearing 148b can be disposed between a second intermediate bearing mount 152, which is formed by the mounting plate 90, and a second end of the first layshaft 140 that is opposite the first end. The first intermediate gear 142 is fixedly coupled to the first layshaft 140 for rotation therewith about the first intermediate axis 148 and includes gear teeth that are meshingly engaged with the gear teeth of the first gear 100. The second intermediate gear 144 is fixedly coupled to the first layshaft 140 for rotation therewith about the first intermediate axis 148 and includes gear teeth that are meshingly engaged with the gear teeth of the second gear 102. It will be appreciated that the first gear 100, the second gear 102 and the first compound gear 106 can form a reduction gearset.

Figure 10:
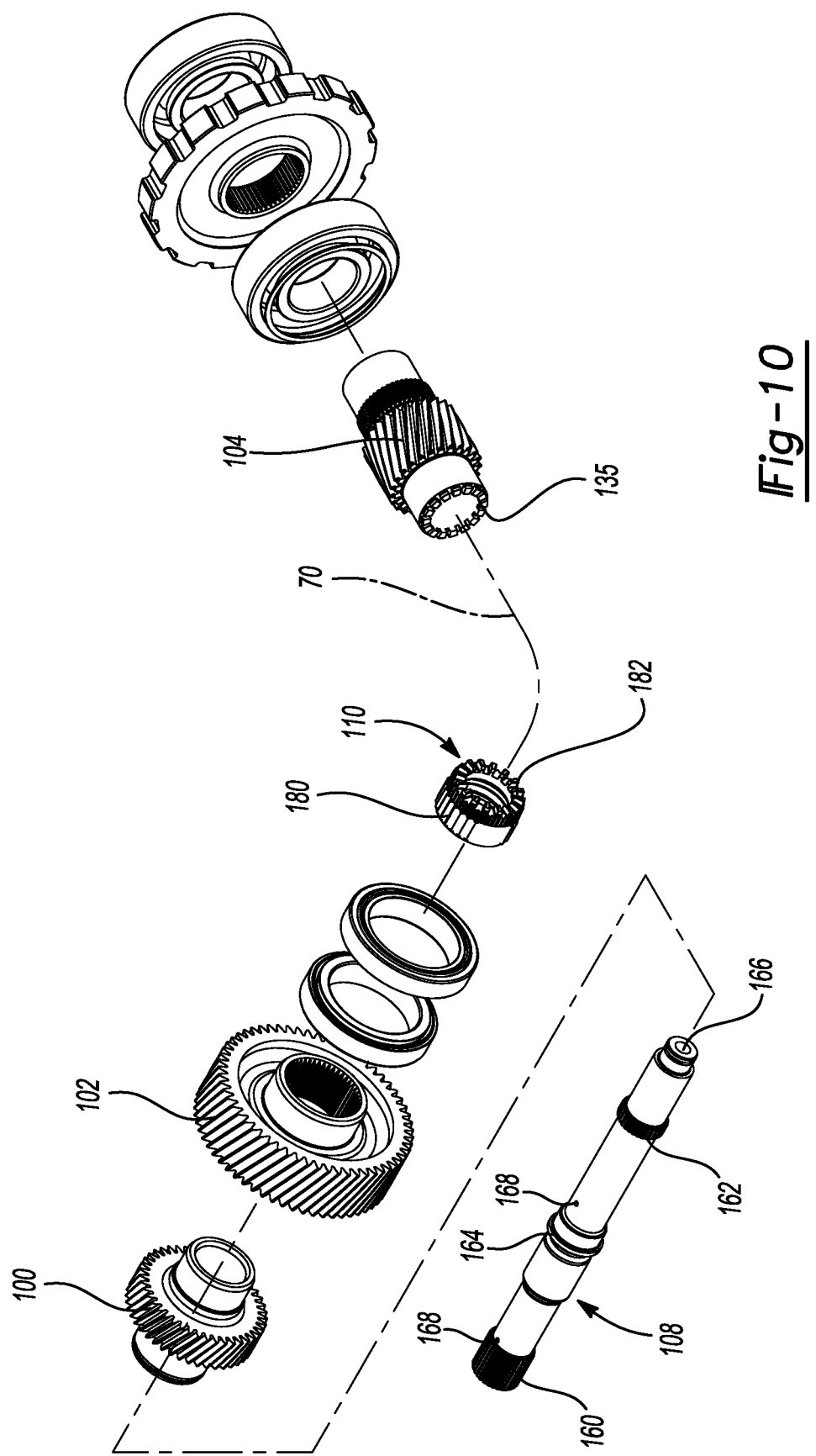
FIG. 10 is an exploded perspective view of a multi-speed input portion of the transmission.

With reference to FIGS. 7 and 10, the input shaft 108 is received concentrically through the first, second and third gear hubs 112, 122 and 132 and is rotatable about the motor axis 70. The input shaft 108 includes a plurality of first external spline teeth 160, which are disposed on a first axial end of the input shaft 108 that is disposed within the motor output shaft 72, a plurality of second external spline teeth 162, which are spaced apart from the first external spline teeth 160 along the motor axis 70, and a circumferential rib 164 that is disposed between the first and second external spline teeth 160 and 162 along the motor axis 70. A lubrication bore 166 can be formed through the input shaft 108 and a plurality of lubrication passages 168 can be formed through the input shaft 108 so as to intersect the lubrication bore 166 and extend radially through the input shaft 108 at desired locations. A lubrication nozzle can be received into the axial end of the input shaft 108 that is proximate the third gear 104 and can be configured to dispense a flow of pressurized lubricating fluid into the lubrication bore 166. Pressurized lubricating fluid in the lubrication bore 166 can be transmitted to the lubrication passages 168 for cooling and/or lubrication of various components, such as bearings or sliding interfaces, and optionally to communicate pressurized lubricating fluid into the motor output shaft 72 where it can be employed to cool and/or lubricate various components of the electric motor 14. In the example provided, the lubrication nozzle is mounted to an auxiliary cover that is mounted to a side of the second housing member 32 that is opposite the transmission cavity 38 and the lubrication nozzle neither contacts nor is sealed to the input shaft 108.

Various bearings can be employed to provide radial support to the input shaft 108 while permitting axial movement of the input shaft 108 along the motor axis 70. In the example provided, a first needle bearing 170 is disposed between the first gear hub 112 and a first cylindrical bearing surface formed on the input shaft 108, while a second needle bearing 172 is disposed between the third gear hub 132 and a second cylindrical bearing surface formed on the input shaft 108.

The coupling sleeve 110 can be received concentrically about the input shaft 108 and is rotatable about the motor axis 70 relative to the input shaft 108. The coupling sleeve 110 can define a shoulder that can abut a first side of the circumferential rib 164 on the input shaft 108. An internal snap ring can be received in a groove formed in the coupling sleeve 110 and can abut a second side of the circumferential rib 164 on a side opposite the shoulder. As such, translation of the input shaft 108 along the motor axis 70 will cause corresponding translation of the coupling sleeve along the motor axis 70. The coupling sleeve 110 defines a plurality of third external spline teeth 180 and a plurality of second face teeth 182. The third external spline teeth 180 are meshingly engaged with the third internal spline teeth 124 that are formed on the second gear hub 122 to thereby couple the coupling sleeve 110 to the second gear 102 in a way that inhibit relative rotation but permits axial sliding movement or translation of the coupling sleeve 110 relative to the second gear 102.

Figure 12:
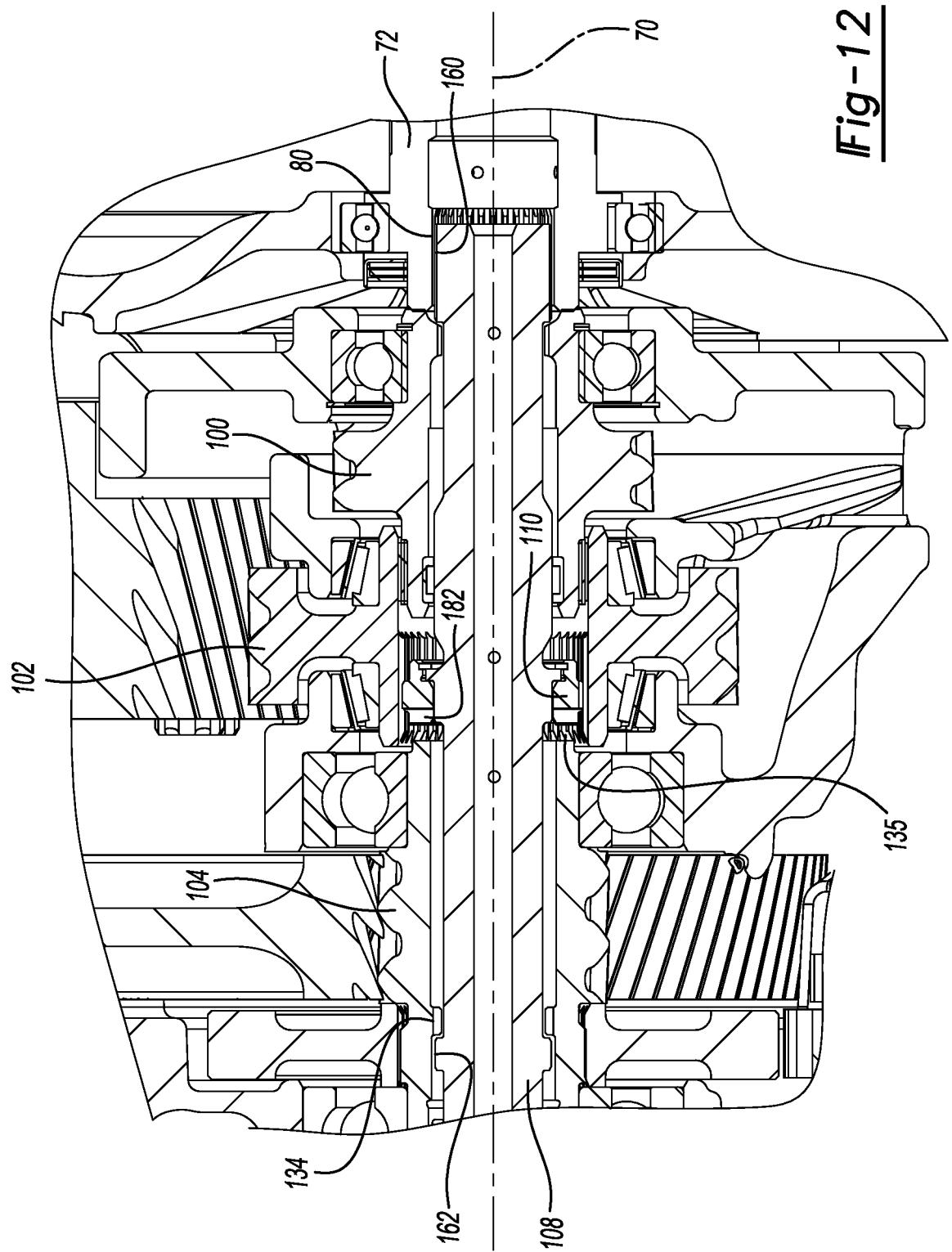
Figure 13:
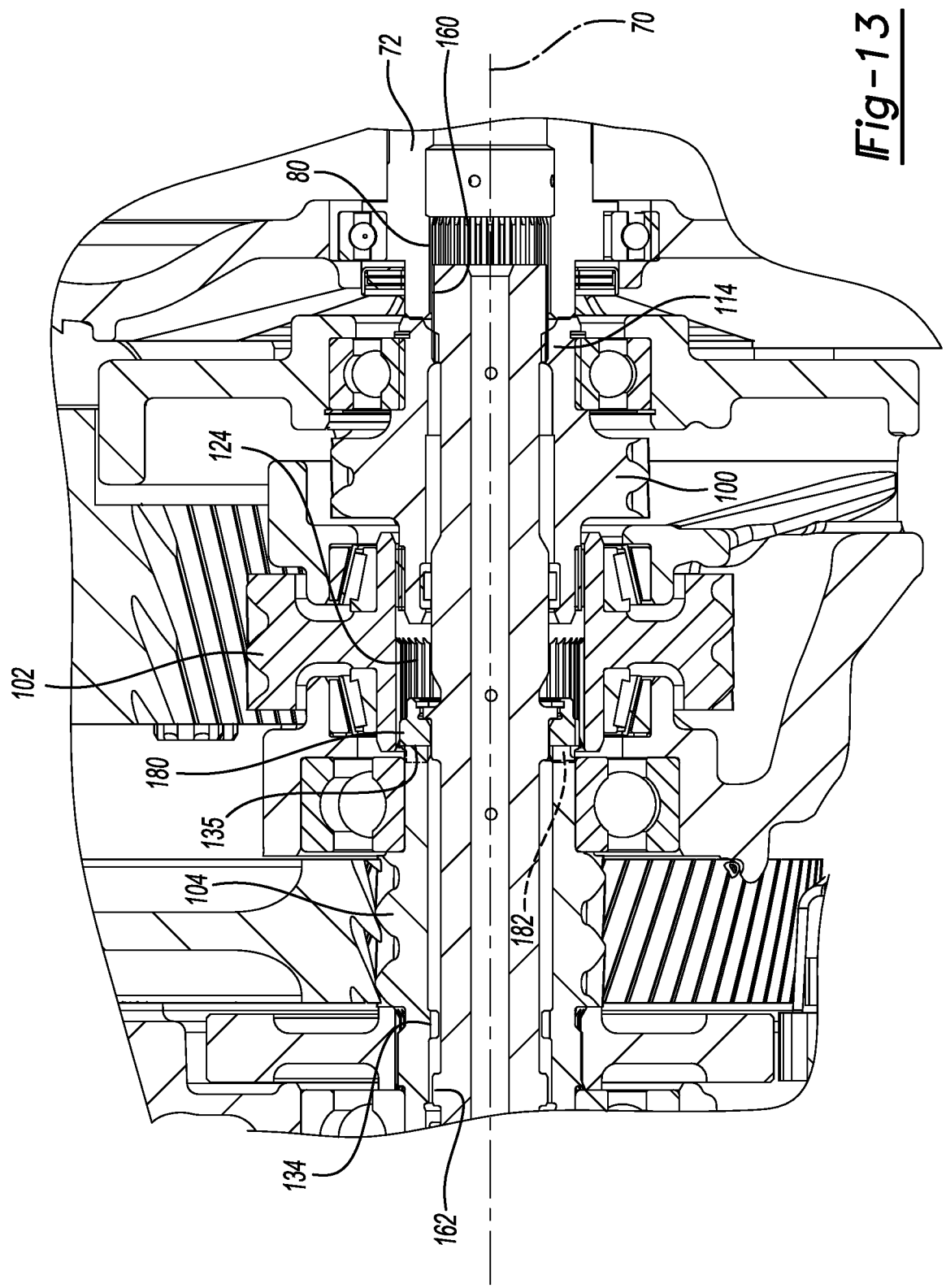

The input shaft 108 is movable along the motor axis 70 between a high-speed position (shown in FIG. 11), a neutral position (shown in FIG. 12), and a low-speed position (shown in FIG. 13). The first external spline teeth 160 on the input shaft 108 are meshingly engaged with the first internal spline teeth 80 on the motor output shaft 72 (thereby coupling the input shaft 108 to the motor output shaft 72 for rotation therewith about the motor axis 70) in each of the high-speed, neutral and low-speed positions.

Figure 11:
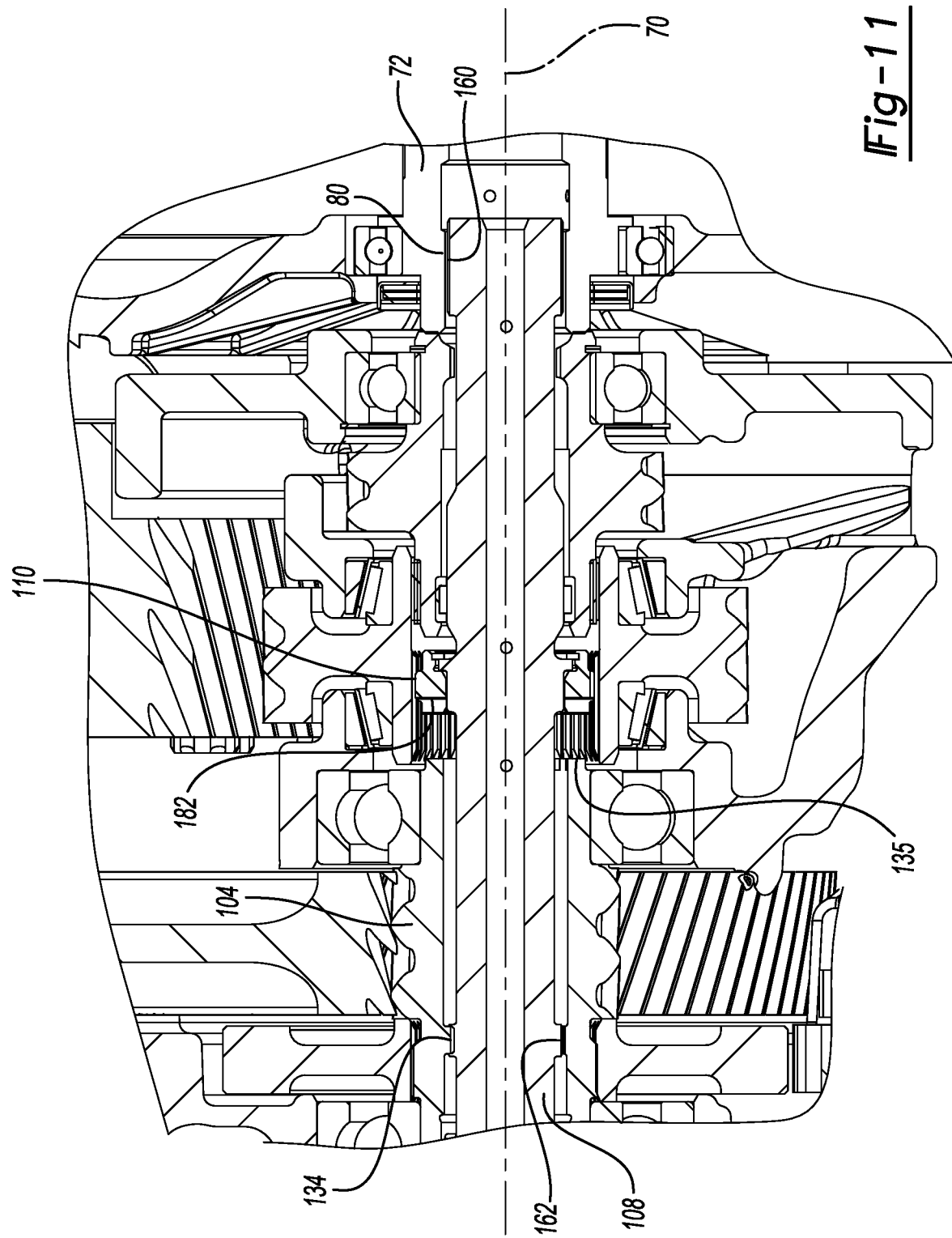
FIGS. 11 through 13 are enlarged portions of FIG. 7 illustrating an input shaft of the multi-speed input portion of the transmission in the high-speed, neutral, and low-speed positions, respectively.

When the input shaft 108 is positioned in the high-speed position as shown in FIG. 11, the first external spline teeth 160 on the input shaft 108 are engaged only to the first internal spline teeth 80 on the motor output shaft 72, the second external spline teeth 162 on the input shaft 108 are engaged to the fourth internal spline teeth 134 formed on the third gear 104, and the second face teeth 182 on the coupling sleeve 110 are spaced apart and disengaged from the first face teeth 135 on the third gear 104. Consequently, rotary power output from the electric motor 14 (FIG. 1) through the motor output shaft 72 is input to the input shaft 108 and transmitted to the third gear 104 to drive the third gear 104 at the rotational speed of the electric motor 14 (FIG. 1).

When the input shaft 108 is positioned in the neutral position as shown in FIG. 12, the first external spline teeth 160 on the input shaft 108 are engaged only to the first internal spline teeth 80 on the motor output shaft 72, the second external spline teeth 162 on the input shaft 108 are spaced apart and disengaged to the fourth internal spline teeth 134 formed on the third gear 104, and the second face teeth 182 on the coupling sleeve 110 are spaced apart and are disengaged from the first face teeth 135 on the third gear 104. Consequently, rotary power output from the electric motor 14 (FIG. 1) through the motor output shaft 72 is input to the input shaft 108 but is not transmitted to any of the first, second and third gears 100, 102 and 104.

When the input shaft 108 is positioned in the low-speed position as shown in FIG. 13, the first external spline teeth 160 on the input shaft 108 are engaged to both the first internal spline teeth 80 on the motor output shaft 72 and the second internal spline teeth 114 on the first gear 100, the second external spline teeth 162 on the input shaft 108 are spaced apart and disengaged from the fourth internal spline teeth 134 formed on the third gear 104, and the second face teeth 182 on the coupling sleeve 110 are engaged with the first face teeth 135 on the third gear 104. Consequently, rotary power output from the electric motor 14 (FIG. 1) through the motor output shaft 72 is input to the input shaft 108 and transmitted to the first gear 100 to drive the first intermediate gear 142 (FIG. 8) to provide a first speed reduction. The second intermediate gear 144 (FIG. 8), which rotates with the first intermediate gear 142 (FIG. 8), drives the second gear 102 to provide a second speed reduction. As the coupling sleeve 110 is rotationally coupled with both the second gear 102 (via the mating engagement of the third external spline teeth 180 with the third internal spline teeth 124) and the third gear 104 (via mating engagement of the second face teeth 182 with the first face teeth 135), the third gear 104 rotates at the rotational speed of the second gear 102. It will be appreciated that the first gear 100, the second gear 102 and the third gear 104 are coaxial with the input shaft 108 and are rotatable relative to the input shaft 108 in at least one of a first speed ratio and a second speed ratio. Additionally, the input shaft 108 is axially movable along the motor axis 70 between a first position, in which a first one of the at least three on-axis gears (i.e., first gear 100, second gear 102, and third gear 104) is rotationally coupled to the input shaft 108, and a second position in which a second, different one of the at least three on-axis gears is rotationally coupled to the input shaft.

Returning to FIGS. 5 and 8, the single-speed output portion 94 receives rotary power from the third gear 104 and includes an output gear 200 that is rotatable about the output axis 58. Optionally, the single-speed output portion 94 can include one or more speed reductions between the third gear 104 and the output gear 200. In the example provided, the single-speed output portion 94 includes a pair of second compound gears 210 that provide the single-speed output portion 94 with two gear reductions between the third gear 104 and the output gear 200.

Each of the second compound gears 210 includes a second layshaft 212, a third intermediate gear 214 and a fourth intermediate gear 216. The second layshaft 212 can be hollow and can be supported on opposite sides by first and second bearings 220a and 220, respectively, for rotation about a respective second intermediate axis 222 that is parallel to but offset from (i.e., not coincident with) both the motor axis 70 and the output axis 58. The first bearing 220a can be disposed between a first intermediate bearing mount that is formed by the first housing member 30, and a first end of the second layshaft 212, while the second bearing 220*b* can be disposed between a second intermediate bearing mount, which is formed by the second housing member 32, and a second end of the second layshaft 212 that is opposite the first end. The third intermediate gear 214 is fixedly coupled to the second layshaft 212 for rotation therewith about the second intermediate axis 222 and includes gear teeth that are meshingly engaged with the gear teeth of the third gear 104. The fourth intermediate gear 216 is fixedly coupled to the second layshaft 212 for rotation therewith about the second intermediate axis 222 and includes gear teeth that are meshingly engaged with gear teeth of the output gear 200. In the example provided, the second compound gears 210 are arranged along the second intermediate axes 222 so that the third intermediate gears 214 are disposed farther away from the first gear 100 than the fourth intermediate gears 216. Configuration in this manner permits the transmission 16 to be relatively compact in an axial direction (e.g., along the output axis 58).

With reference to FIGS. 5 and 8, the differential assembly 18 can include a differential input member 230, which is coupled to the output gear 200 for rotation therewith, and a pair of differential output members 232 that are rotatable relative to the differential input member 230 about the output axis 58. The differential assembly 18 can be configured in any desired manner. For example, the differential assembly 18 could be configured with a bevel gearset having (straight) bevel side gears and differential pinions, and the differential input member 230 could be a differential case that houses the side gears and the differential pinions. In the example provided, the differential assembly 18 is configured as a planetary or epicyclic differential assembly having an internal gear (not specifically shown), a sun gear (not specifically shown), a planet carrier (not specifically shown) and a plurality of sets of planet gears (not specifically shown). The internal gear can be fixedly coupled to (e.g., unitarily and integrally formed with) the output gear 200 of the transmission 16. The sun gear is disposed concentrically within the internal gear and is rotatable about the output axis 58. The planet carrier is rotatable about the output axis 58. Each of the sets of planet gears is meshed with both the internal gear and the sun gear and includes one or more planet gears that are journally supported by the planet carrier. In situations where the sets of planet gears comprise two or more planet gears, each of the planet gears is meshed with another one of the planet gears, one of the planet gears is meshed with the internal gear, and a different one of the planet gears is meshed with the sun gear. In the example shown, each set of planet gears comprises a first planet gear, which is meshingly engaged to the internal gear and journally supported by the planet carrier, and a second planet gear that is meshingly engaged to both the first planet gear and the sun gear and which is also journally supported by the planet carrier. In this configuration, the sun gear and the planet carrier are the differential output members 232 of the differential assembly 18. The differential bearings 54 can be mounted radially between the gearcase and hubs (not specifically shown) formed on the planet carrier to support the differential input member 230 for rotation about the output axis 58. In the example shown, the differential bearings 54 are tapered roller bearings that additionally provide support to the differential assembly 18 in an axial direction along the output axis 58.

With reference to FIGS. 2 and 5, each of the axle shafts 20 is received through a corresponding one of the axle tubes 34 and is coupled for rotation with a corresponding one of the differential output members 232. Various bearings (not specifically shown) can be employed to support the axle shafts 20 relative to the housing assembly 12. In the example provided, the multi-speed electric drive axle 10 has a "full floating" axle configuration in which the axle shafts 20 are rotationally coupled to wheel hubs 250 that are supported (axially and rotationally) on the axle tubes 34 so that the axle shafts 20 transmit rotational torque between the differential assembly 18 and an associated vehicle wheel (not shown) but do not carry the weight of the vehicle. It will be appreciated, however, that the multi-speed electric drive axle 10 could be configured differently and that it could have any desired configuration (e.g., semi-floating, three-quarters floating, independent).

Figure 14:
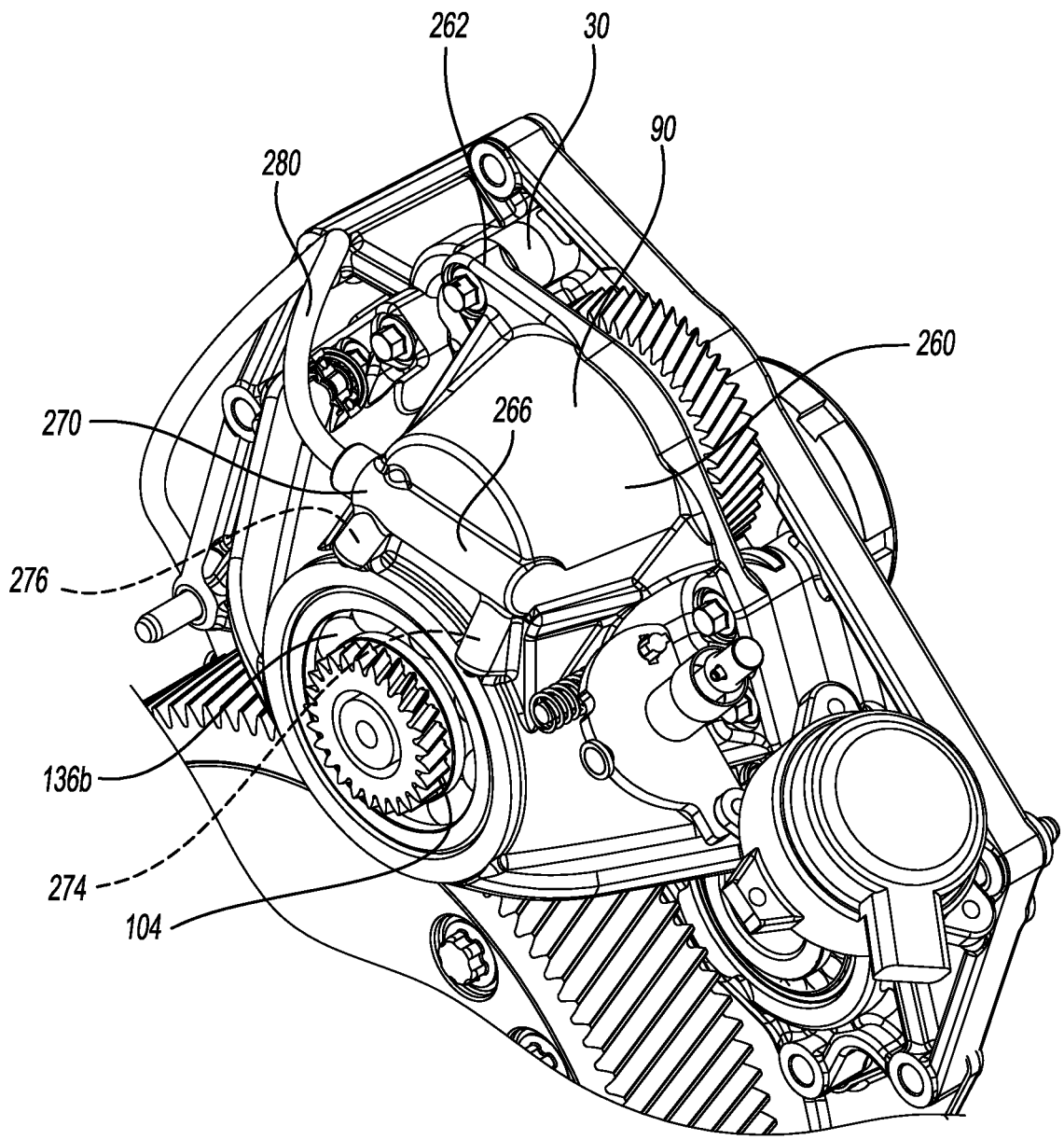
FIG. 14 is a perspective view of a portion of the electric drive axle of FIG. 1, illustrating a portion of the transmission that includes a mounting plate.

With reference to FIGS. 3, 9 and 14, the mounting plate 90 includes a mounting plate body 260, flange member 262, a plurality of bearing mounts (a bearing mount 264*a*, a bearing mount 264*b* and the second intermediate bearing mount 152), and a lubrication gallery 266. The flange member 262 is fixedly coupled to and extends about the mounting plate body 260. The flange member 262 is configured to abut an interior or inboard surface of the first housing member 30. A plurality of threaded fasteners can be received through the flange member 262 and can be threadably engaged to corresponding threaded holes (not specifically shown) in the first housing member 30 to secure the mounting plate 90 to the first housing member 30. A locating means, such as one or more dowel pins or a pair of roll pins, can be employed to position or locate the mounting plate 90 relative to the first housing member 30. The mounting plate body 260 can be contoured to form a space or cavity that can accommodate the gear teeth of the third gear 104 and the first intermediate gear 142.

The bearing mount 264*a* is disposed on a first side of the mounting plate body 260 (i.e., a side that faces the first housing member 30) and is configured to receive one of the bearings 126 that supports the second gear 102. The bearing mount 164*b* is disposed on a second, opposite side of the mounting plate body 260 (i.e., a side that faces the second housing member 32) and is configured to receive one of bearings (i.e., bearing 136*a*) that supports the third gear 104. The second intermediate bearing mount 152 is formed on the first side of the mounting plate body 260 and is configured to receive the bearing 146*b* that supports the first layshaft 140 of the first compound gear 106.

Figure 15:
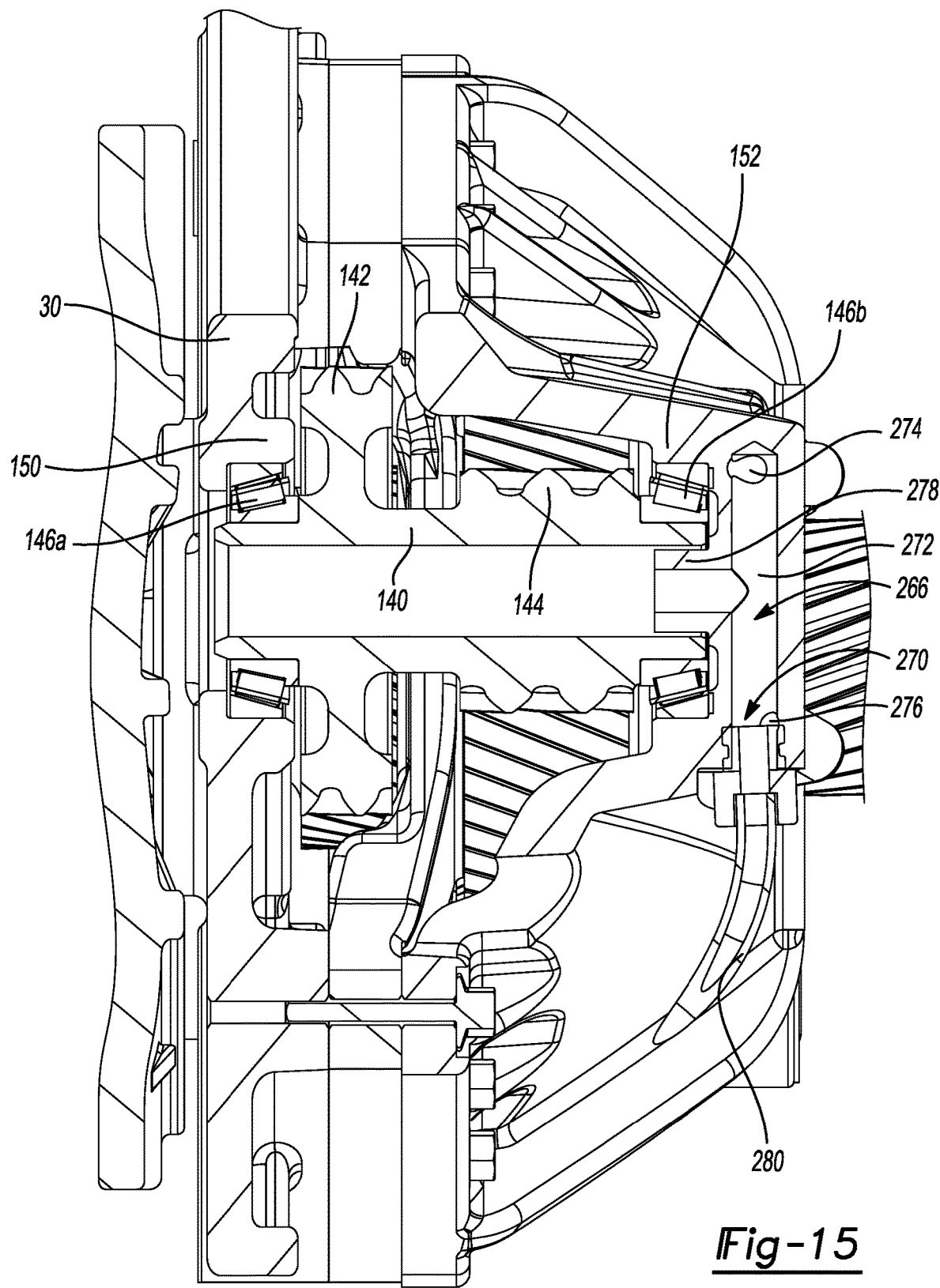
FIG. 15 is a section view taken through a portion of the electric drive axle illustrating one of the layshafts of the transmission as mounted between the mounting plate and a portion of a housing assembly.
Figure 16:
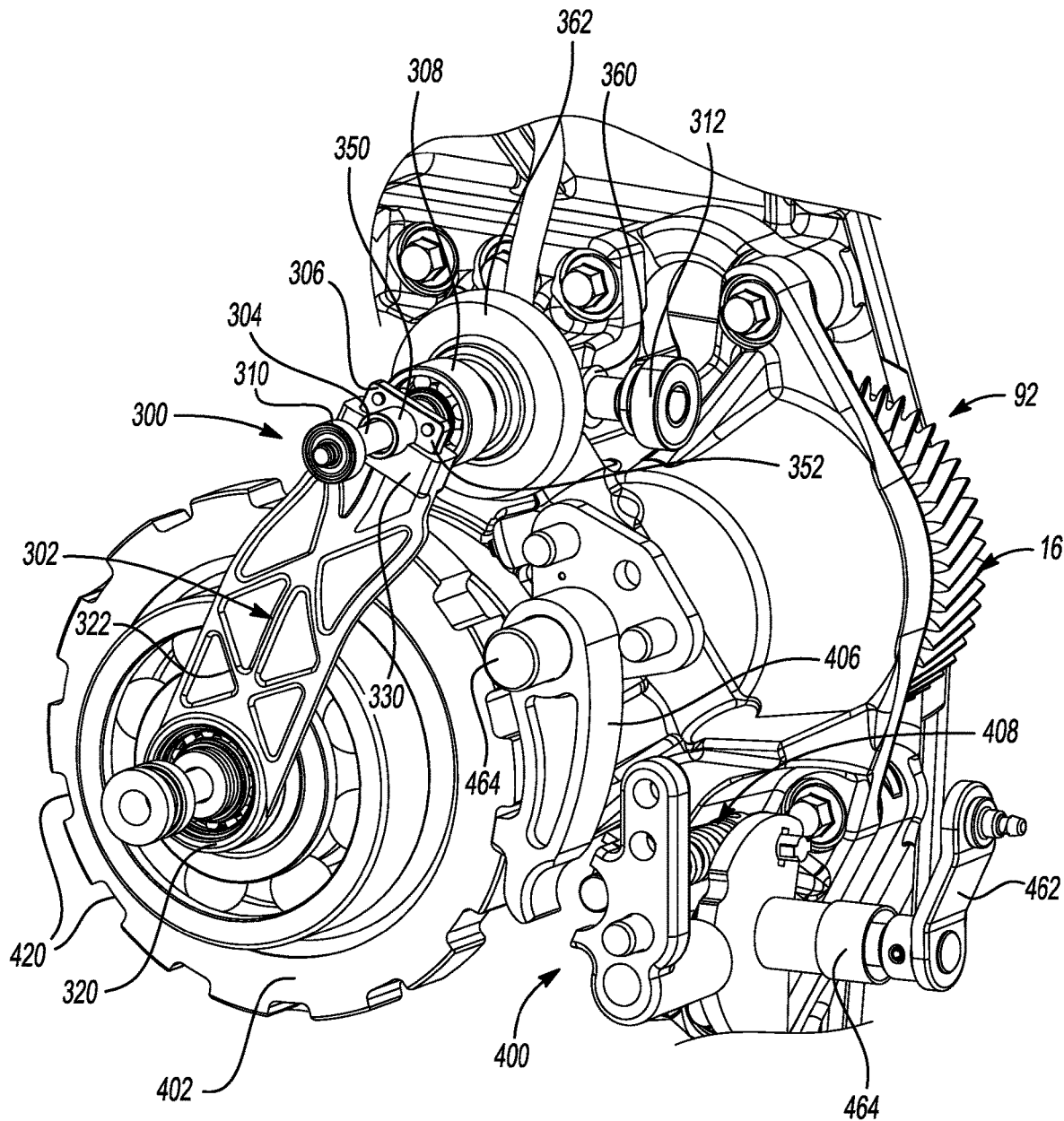
FIG. 16 is a perspective view of a portion of the electric drive axle of FIG. 1 illustrating an actuator assembly for operating the multi-speed input portion of the transmission and a park-lock mechanism in more detail.
Figure 17:
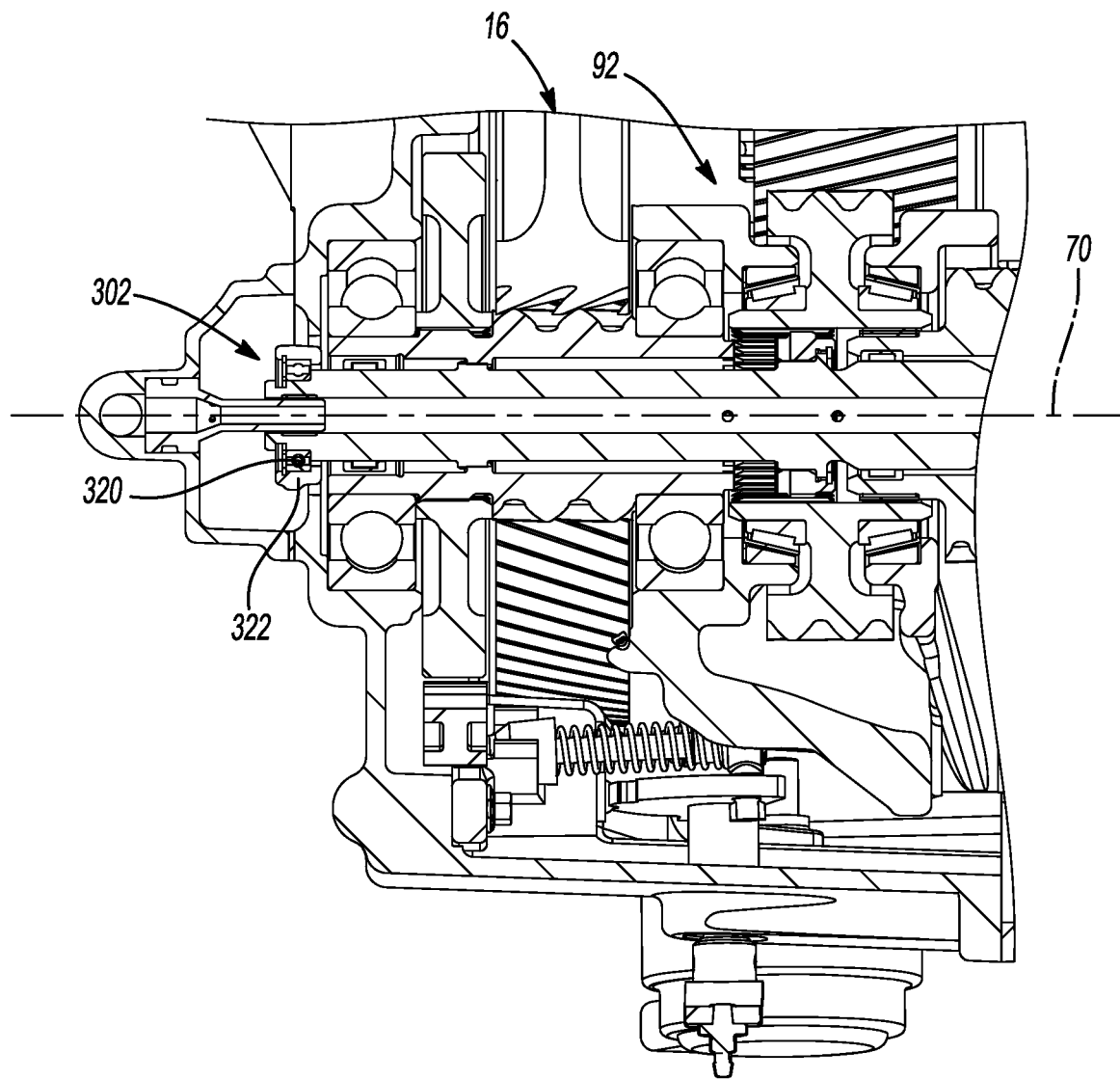
FIG. 17 is a section view of a portion of the electric drive axle of FIG. 1 illustrating a connection between the actuator assembly and the input shaft.
Figure 18:
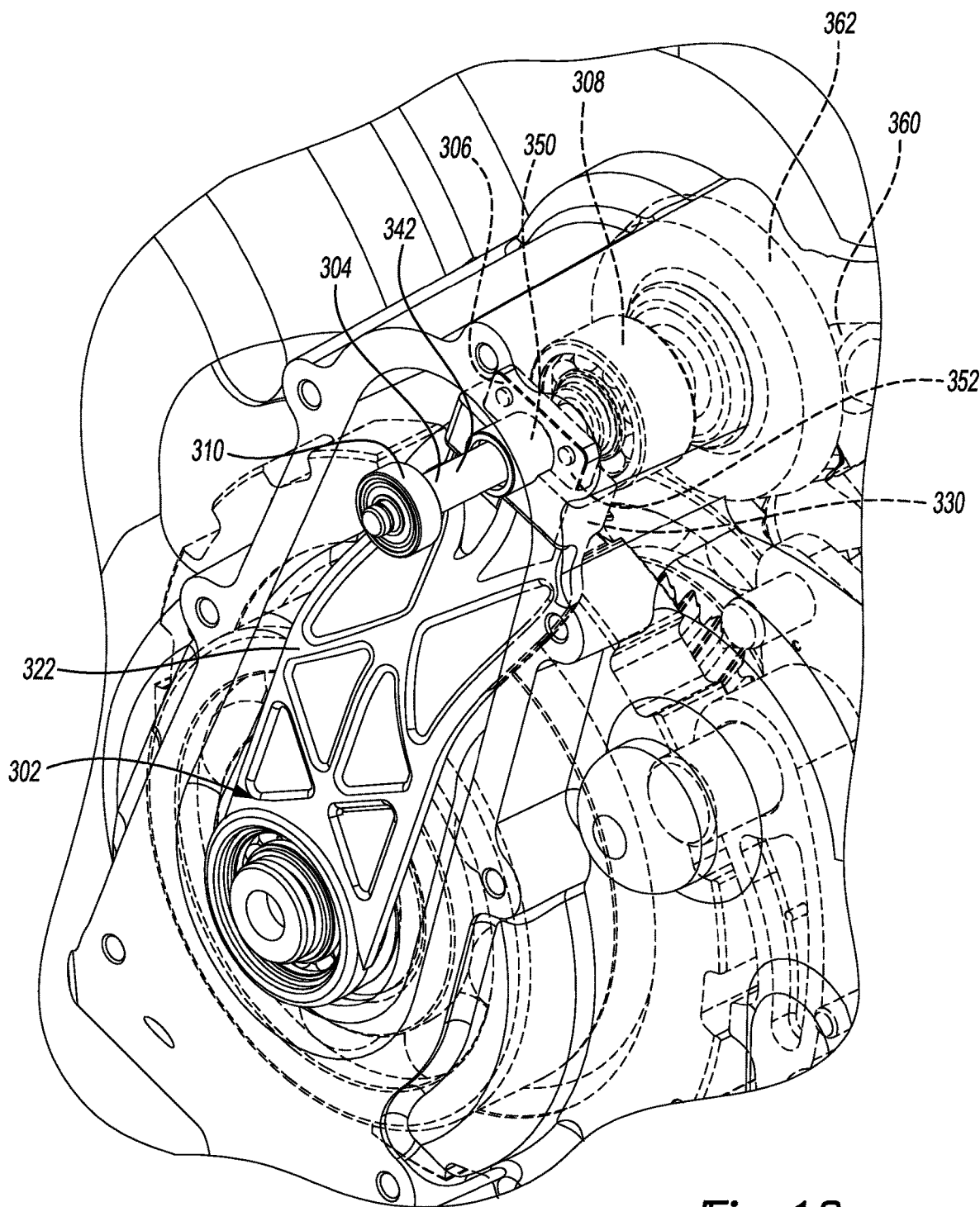
FIG. 18 is a perspective view of the electric drive axle of FIG. 1 illustrating the actuator assembly in more detail.

With reference to FIGS. 14 and 15, the lubrication gallery 266 includes an inlet port 270, one or more fluid passages (e.g., fluid passages 272, 274 and 276), and one or more fluid outlets (e.g., an outlet nozzle 278, and/or one or more outlet orifices (not specifically shown)). The inlet port 270 is configured to be coupled in fluid communication to a source or flow of pressurized lubricating fluid. In the example provided, the inlet port 270 is coupled in fluid communication to a hose 280 that provides pressurized lubricating fluid to the lubrication gallery 266. The fluid passages are generally configured to route the pressurized lubricating fluid through the mounting plate 90 between the inlet port 270 and the fluid outlets. In the example provided, a first fluid passage 272 receives pressurized lubricating fluid from the inlet port 270 and transmits the pressurized lubricating fluid to second and third fluid passages 274 and 276, respectively, and to the outlet nozzle 278. The outlet nozzle 278 supplies pressurized lubricating fluid to both the second intermediate bearing mount 152 (for lubrication of both the second bearing 146*b* and the teeth of the second intermediate gear 144), as well as to the hollow interior of (i.e., a longitudinal passage in) the first layshaft 140. Pressurized lubricating fluid that travels through the first layshaft 140 can be transmitted into the first intermediate bearing mount 150 and employed to lubricate both the first bearing 146*a* and the teeth of the first intermediate gear 142. The outlet orifices can be located and sized to provide lubrication in desired areas, such as the bearing 146*b* and/or the teeth of the third gear 104. Additionally or alternatively, one or more of the fluid passages in the mounting plate 90 could transmit pressurized lubricating fluid into the first housing member 30, for example for lubrication of various bearings (e.g., the bearings that are mounted in the first housing member 30 and support the second compound gears 210), and/or gear meshes.

With reference to FIGS. 16 through 19, the multi-speed input portion 92 of the transmission 16 can further include an actuator assembly 300 that is configured to move the input shaft 108 between the high-speed, neutral and low-speed positions. The actuator assembly 300 can be configured in any manner desired, but in the particular example provided, includes an output assembly 300, a lead screw 304, a coupler 306, first and second actuator bearings 308 and 310, and an actuator motor 312.

The output assembly 300 can include a bearing 320 and an axially movable member 322. The bearing 320 can be received over the input shaft 108 and can be abutted against a shoulder that is formed on the input shaft 108. The axially movable member 322 can extend between the motor axis 70 and a rotational axis of the lead screw 304 and can define a bearing aperture and a coupler mount 330 that are disposed on its opposite ends. The bearing 320 is received in the bearing aperture and can be fixedly coupled to the axially movable member 322 in any desired manner. In the example provided, an internal snap ring is mounted into a snap-ring groove that is formed into the axially movable member 322 concentric with the bearing aperture b4 and on an axial end of the bearing 320 that is opposite the axial end of the bearing 320 that abuts the shoulder on the input shaft 108. Accordingly, the axially movable member 322 is coupled to the input shaft 108 in a manner that inhibits relative axial movement between the axially movable member 322 and the input shaft 108 but which permits rotation of the input shaft 108 relative to the axially movable member 322.

The lead screw 304 is rotatably disposed about a lead screw axis and includes a lead screw input 340 and an externally threaded portion 342.

Figure 19:
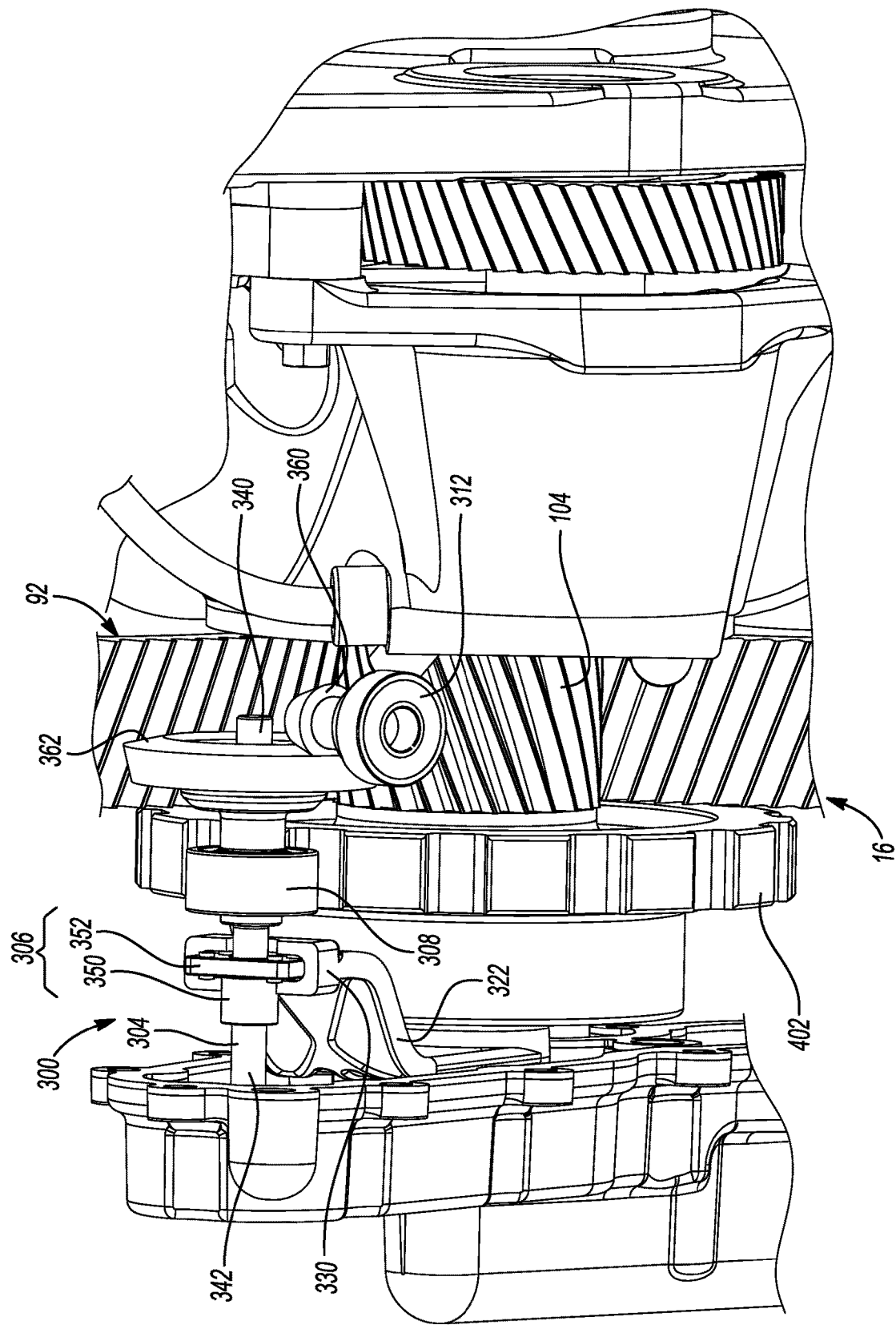
FIG. 19 is a perspective view of a portion of the electric drive axle of FIG. 1 illustrating portions of the actuator assembly in more detail.
Figure 19A:
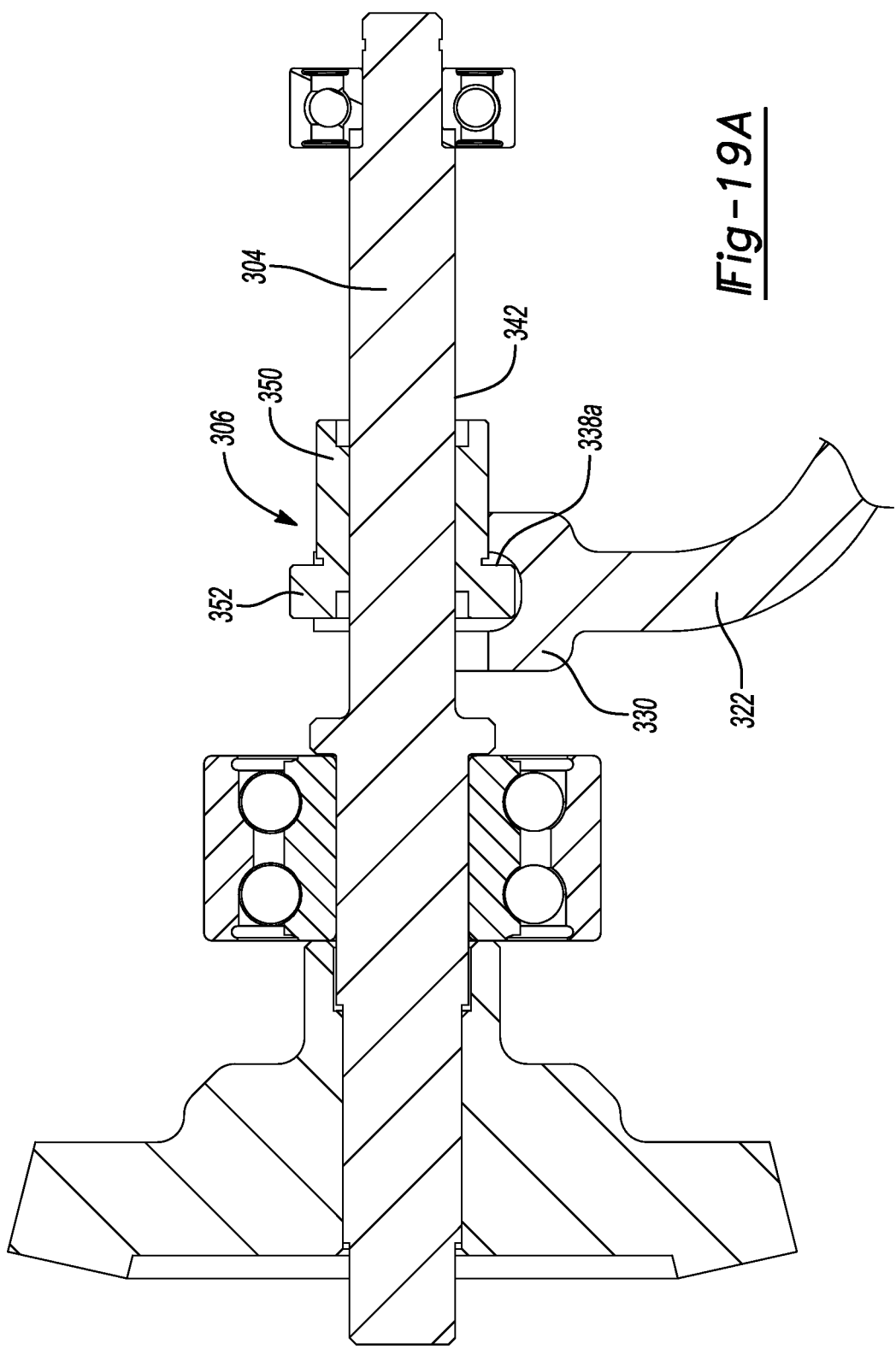
FIG. 19A is a section view of a portion of the actuator assembly taken in a plane that includes both a rotational axis of a lead screw and a shift axis about which the input shaft rotates and along which the input shaft translates.
Figure 19B:
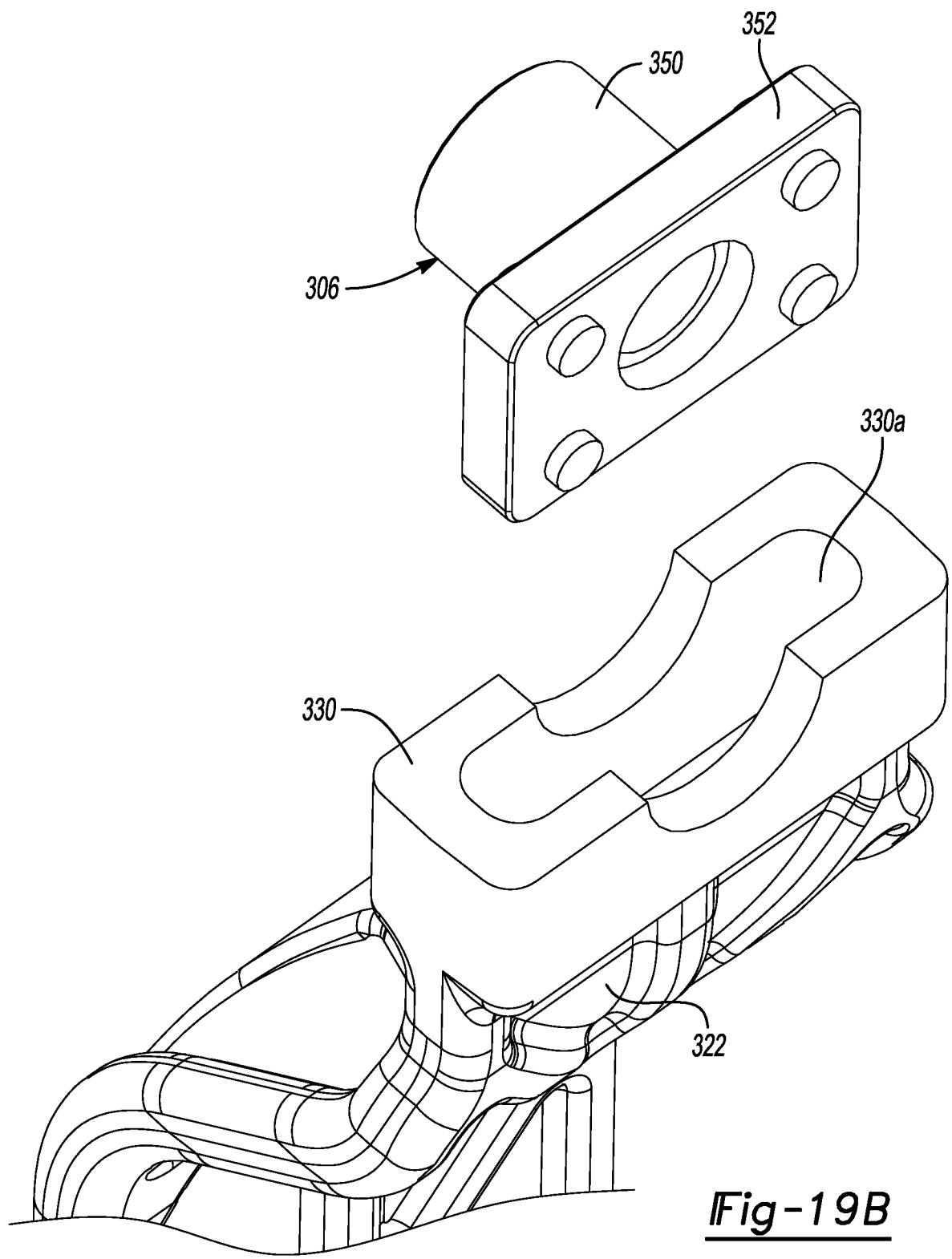
FIG. 19B is an exploded perspective view that illustrates an axially movable member of an output assembly and a coupler of the actuator assembly where the coupler is exploded from an axial end of the axially movable member.
Figure 19C:
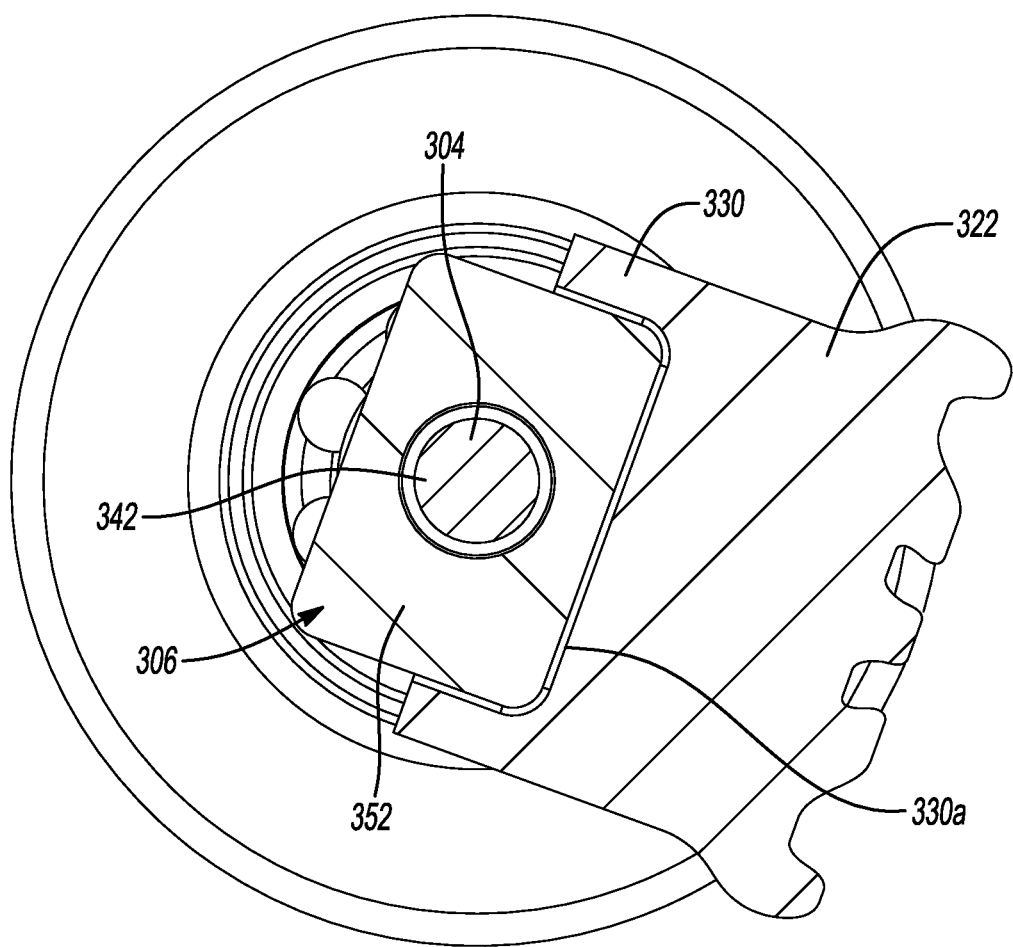
FIG. 19C is a section view of a portion of the actuator assembly taken perpendicular to the rotational axis of the lead screw.
Figure 19F:
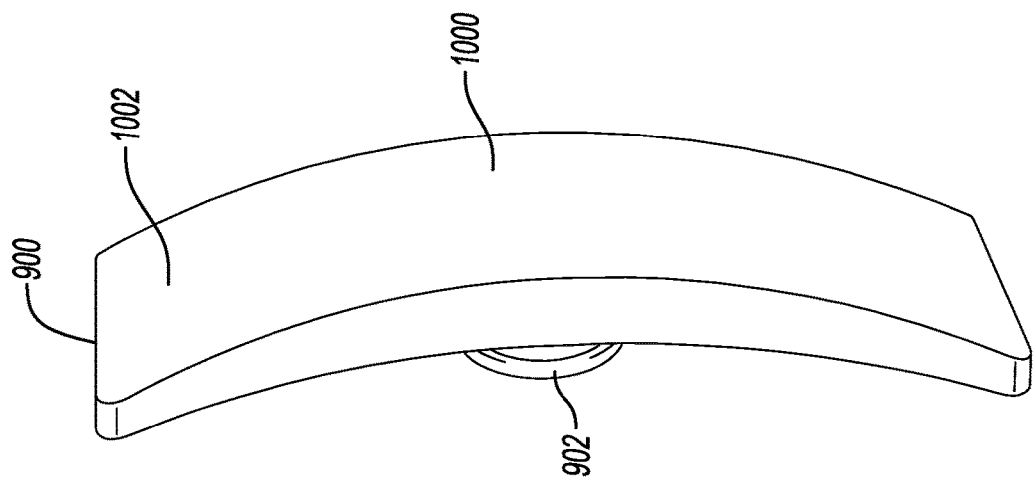
FIGS. 19E and 19F are perspective views of the coupler pad.
Figure 19E:
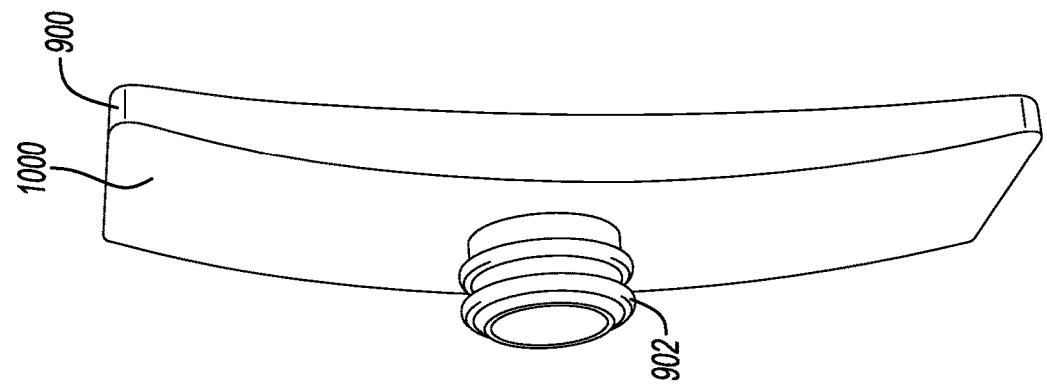
Figure 19D:
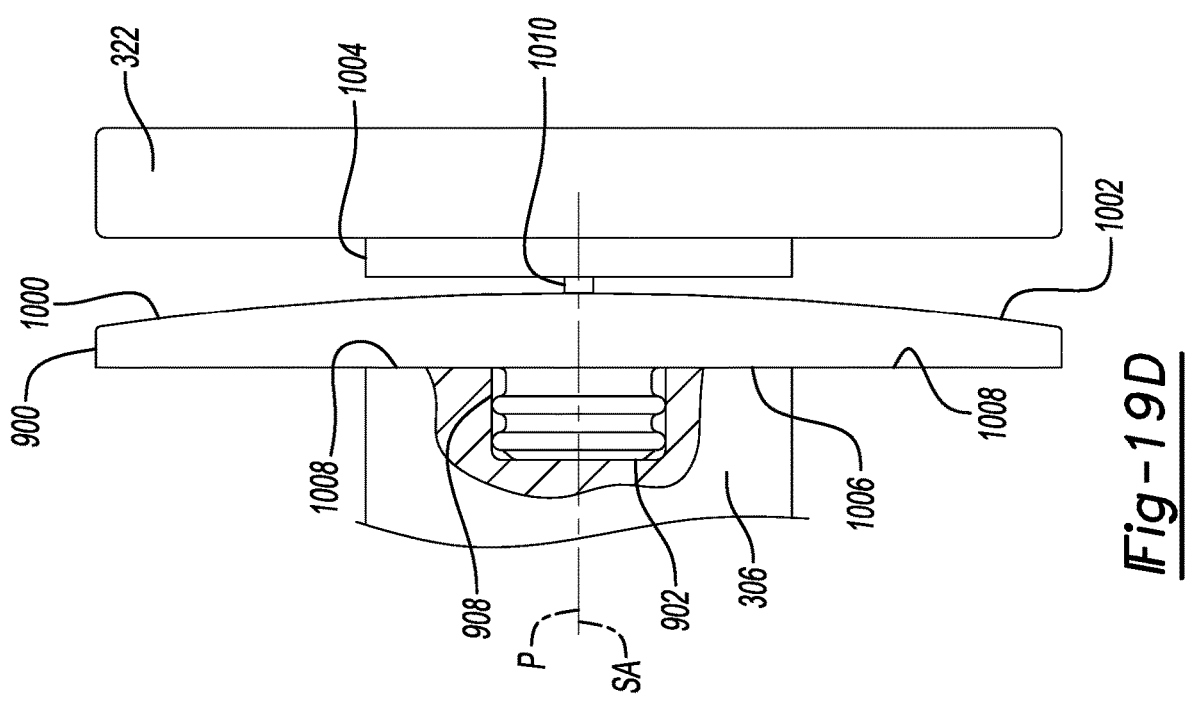
FIG. 19D is partly sectioned view of a portion of another actuator assembly, illustrating a coupler pad coupled to a coupler and mounted to an axially movable member.
Figure 19G:
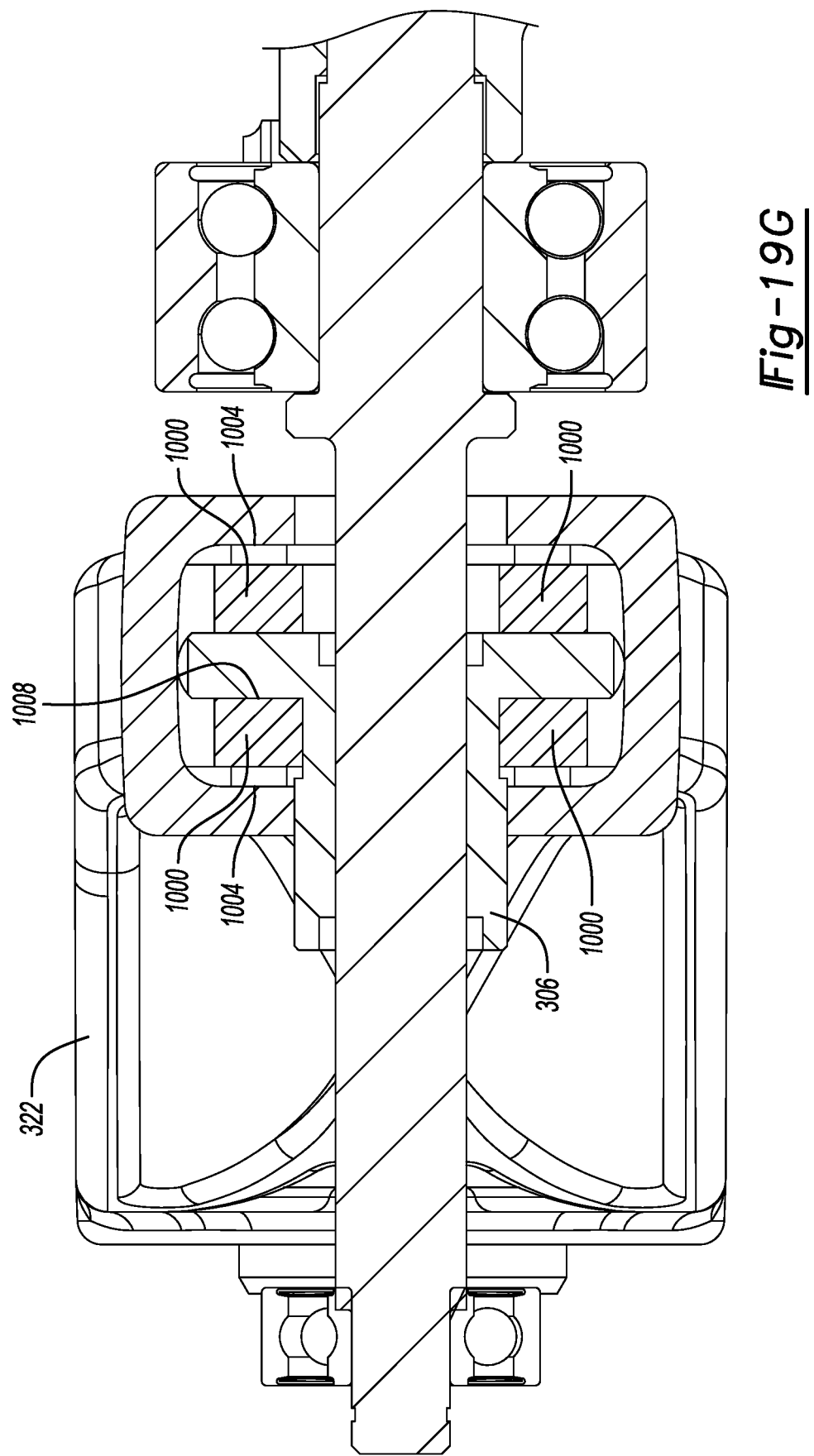
FIG. 19G is a section view of a portion of the actuator assembly of FIG. 19D.
Figure 20:
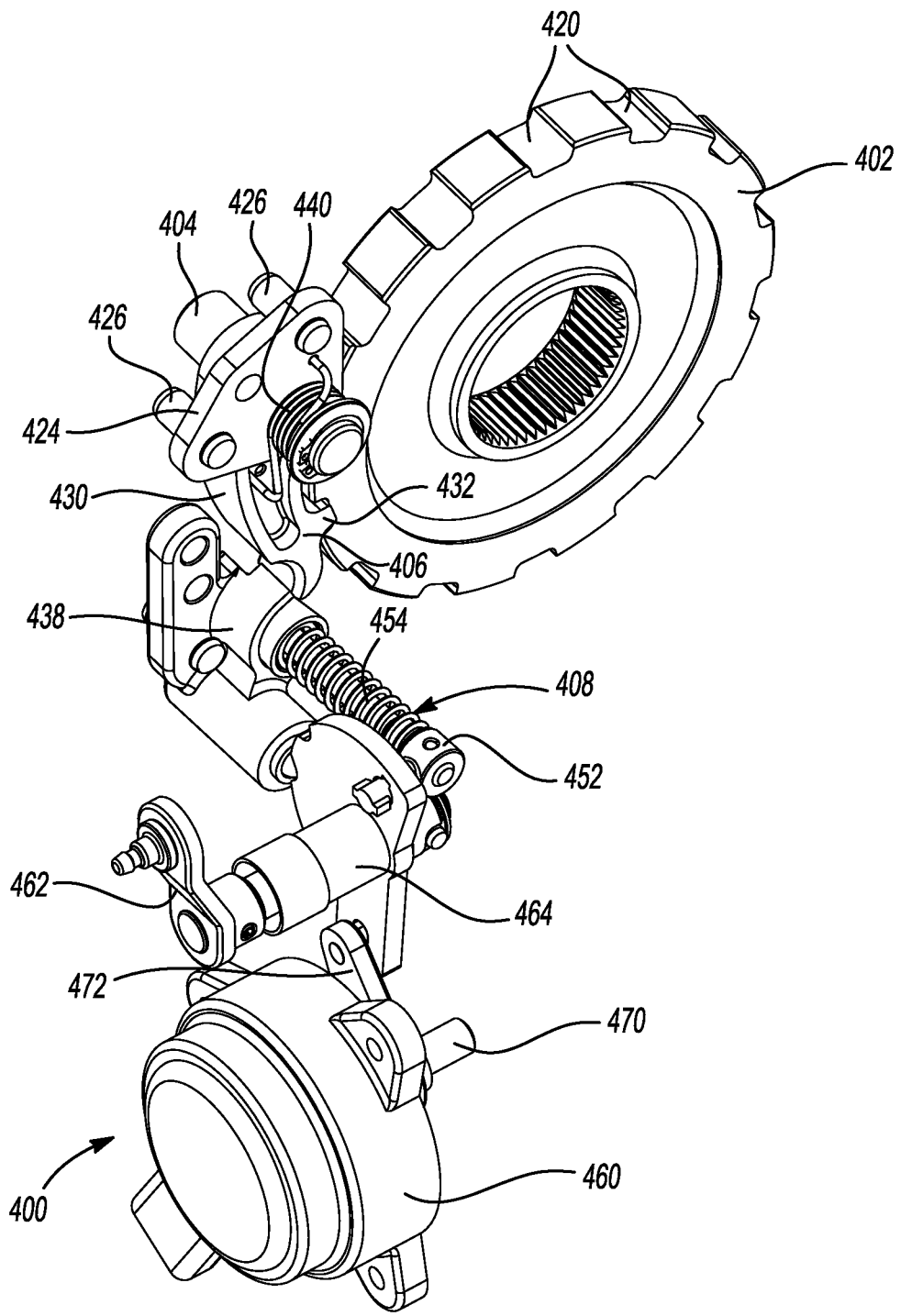
FIG. 20 is a perspective view of the park-lock mechanism.
Figure 21:
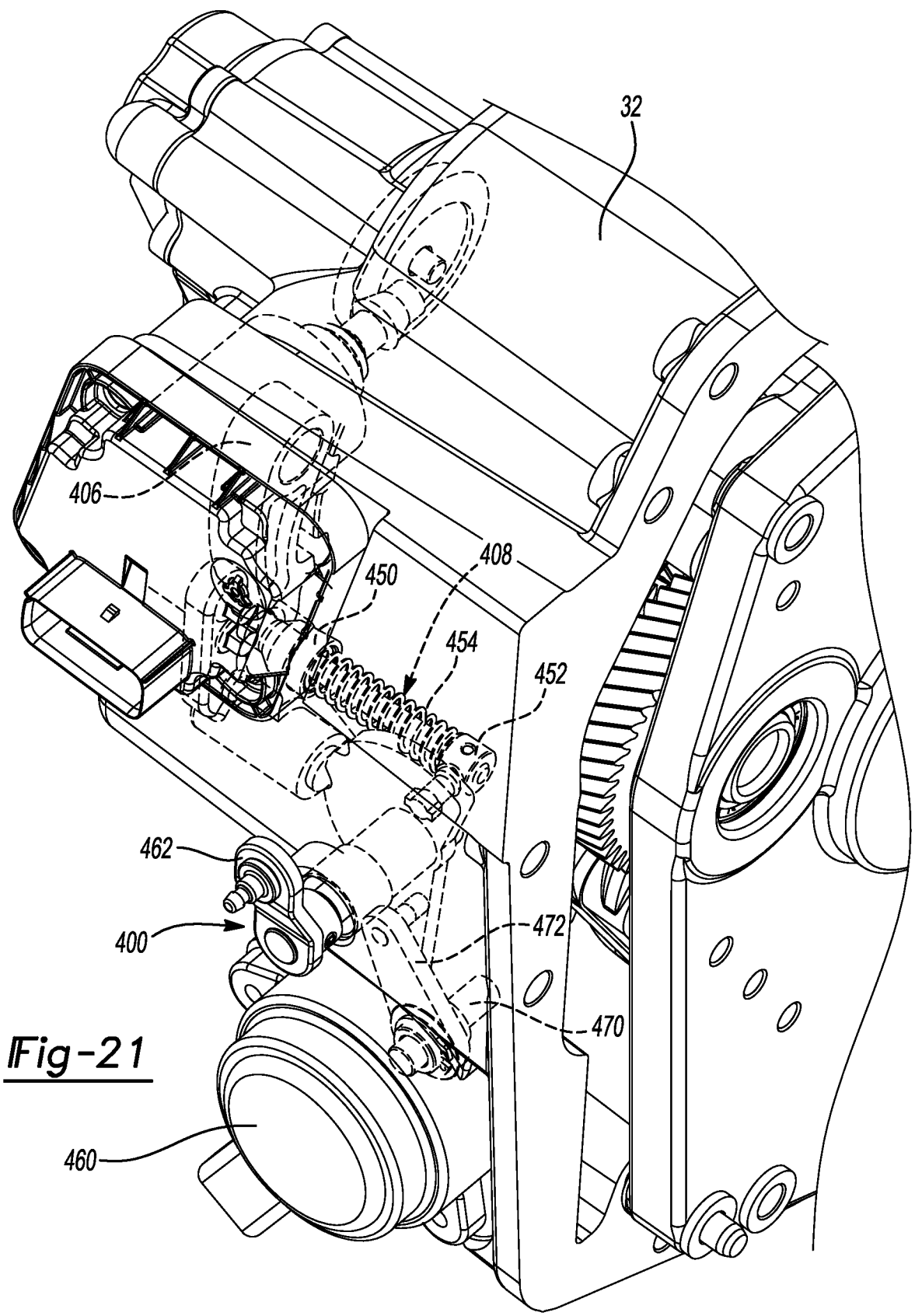
FIG. 21 is a perspective view of a portion of the electric drive axle of FIG. 1 illustrating the park-lock mechanism in more detail.
Figure 22:
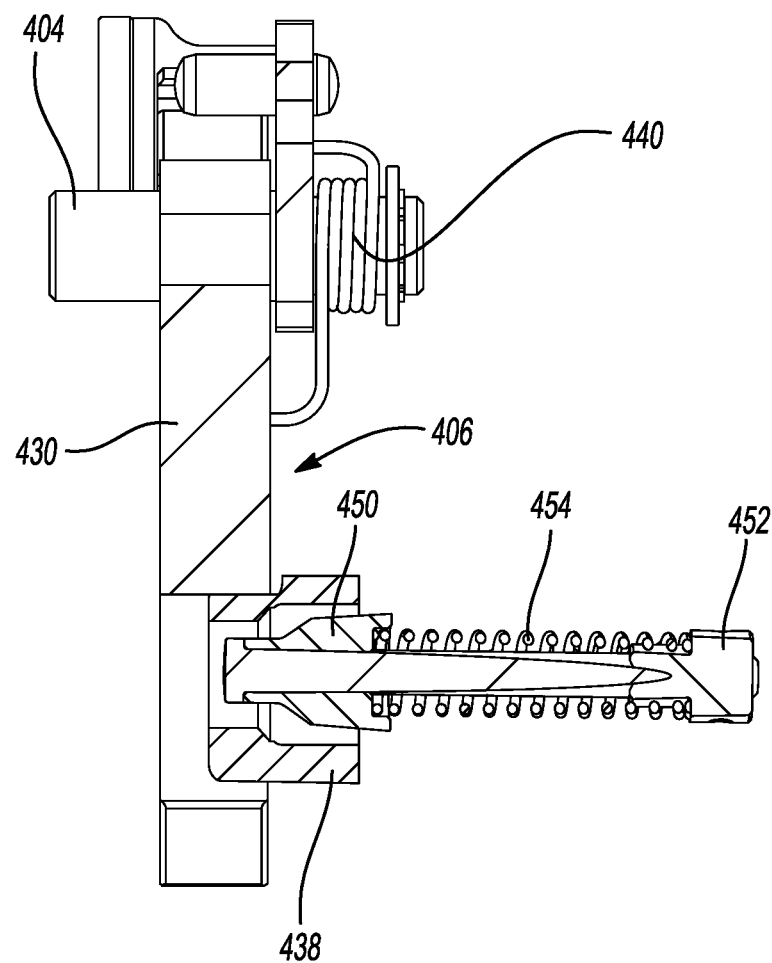
FIG. 22 is a section view taken through a portion of the park-lock mechanism that illustrates the park-lock plunger assembly in operative association with a guide and a park pawl.

With reference to FIGS. 19A-19C, the coupler 306 can have an internally threaded hub 350 and a mounting flange 352 that can be mounted to the coupler mount 330. The internally threaded hub 350 can be threaded onto the externally threaded portion 342 of the lead screw 304. It will be appreciated that the mounting flange 352 and the coupler mount 330 can be configured in any desired manner. In the example provided, the mounting flange 352 has a non-circular cross-sectional area (taken perpendicular to the longitudinal axis of the internally threaded hub 350) and the coupler mount 330 defines a pocket 330*a* into which a portion of the mounting flange 352 is received so that the mounting flange 352 is axially and non-rotatably coupled to the coupler mount 330. Accordingly, rotation of the lead screw 304 causes corresponding translation of both the coupler 306 and the output assembly 300.

Optionally, one or more coupler pads 1000 can be coupled to the mounting flange 352 and can extend from one or both sides of the mounting flange 352. The coupler pads 1000 can contact an interior surface of the pocket 330*a* in the coupler mount 330. The coupler pads 1000 can be employed for various purposes, such as helping to direct forces that are transmitted between the coupler 306 and the axially movable member 322 in a desired manner, and/or providing vibration damping between the coupler 306 and the axially movable member 322.

With reference to FIGS. 19B and 19D-19G, the coupler pads 1000 can have a pad member 900 and a projection 902. The pad member 900 has a first surface 1002, which abuts an interior surface of the pocket 330*a*, and a second surface 1004 that abuts an associated front or rear axial surface of the coupler 306. One of the first and second surfaces 1002 and 1004 of the pad member 1002 is curved so that contact between each coupler pad 1000 and the one of the coupler 306 and the axially movable member 322 occurs over an associated line that extends in a plane P that includes the rotational axis SA of the lead screw 304 and is parallel to a shift axis (i.e., the axis along which movement causes shifting, which is the motor axis 70 in the example provided). The projection 902 can be configured to be received into an aperture 908 that can be formed in the coupler 306 or the coupler mount 330 such that the projection 902 is coupled to the coupler 306 or the coupler mount 330 with a snap or interference fit. In the example provided, the projections 902 are fitted into apertures 908 that are formed in the coupler 306.

The first and second bearings 308 and 310 can be mounted to the gearcase and can support the lead screw 304 for rotation about the lead screw axis.

The actuator motor 312 is configured to provide rotary power to drive the lead screw 304 about the lead screw axis. The actuator motor 312 can be directly coupled to the lead screw input or a speed reduction, such as a reduction gearset, can be disposed between the actuator motor 312 and the lead screw input. In the example provided, a reduction gearset that utilizes bevel gearing is employed. More specifically, the reduction gearset comprises an actuator input gear 360, which is directly driven by the actuator motor 312 about an axis that is perpendicular to the lead screw axis, and an actuator output gear 362 that is meshingly engaged with the actuator input gear 360 and rotatable about the lead screw axis. It will be appreciated that the reduction gearset could be configured differently and need not utilize bevel gearing. The actuator output gear 362 can be coupled to the lead screw input in any desired manner. For example, the actuator output gear 362 can be directly coupled to the lead screw input so that the lead screw 304 rotates directly with the actuator output gear 362. Alternatively, a torsionally resilient coupling could be employed between the actuator output gear 362 and the lead screw input 340 to provide compliance in one or both rotational directions between the actuator output gear 362 and the lead screw 304. In the example provided, a torsionally resilient coupling permits the actuator output gear 362 to rotate in instances where the input shaft 108 is not able to translate (e.g., due to: 1) tooth-on-tooth contact between one of the sets of external splines on the input shaft and one of the sets of internal splines on one of the first or third gears or between the first and second face teeth; or 2) the magnitude of the torque that is exerted through the input shaft 108, i.e., torque loading).

With reference to FIGS. 16 and 19 through 22, a park-lock mechanism 400 can be incorporated into the multi-speed electric drive axle 10 (FIG. 1). In the example provided, the park-lock mechanism 400 is configured to inhibit rotation of the third gear 104 to inhibit rotation of the differential input member 230 (FIG. 5) and thereby inhibit rotation of the differential output members 232 (FIG. 5). The park-lock mechanism 400 can include a park-lock gear 402, a pivot pin 404, a park pawl 406, and a park-lock plunger assembly 408.

The park-lock gear 402 can be fixedly coupled to the third gear 104 and can define a plurality of park-lock teeth and a plurality of valleys 420 that are each disposed circumferentially between an associated pair of the park-lock teeth. The pivot pin 404 can be received into a pivot pin aperture formed in the second housing member 32 and can be rotatable about a pivot axis relative to the second housing member 32. In the example provided, the pivot pin 404 is mounted on a bracket 424.

The park pawl 406 includes a pawl body 430 which is coupled to the pivot pin 404 for rotation about the pivot axis, and a pawl member 432 that is fixedly coupled to the pawl body 430. The pawl body 430 can pivot relative to the park-lock gear 402 between a first or locked position, in which the park pawl 406 is received into a valley 420 to thereby inhibit rotation of both the park-lock gear 402 and the third gear 104 about the motor axis 70, and a second or unlocked position in which the park pawl 406 is disengaged from the park-lock gear 402 and does not inhibit rotation of the park-lock gear 402 about the motor axis 70. The park-pawl 406 can optionally include a guide structure 438 that can be mounted to the second housing member 32. The guide structure 438 can have a guide member that can guide the pawl body 430 as it moves between the first and second positions. Movement of the guide structure 438 caused by corresponding movement of the plunger 450 can cause corresponding pivoting motion of the pawl body 430 about the pivot pin 404.

A biasing spring, such as a torsion spring 440, can be employed to bias the pawl body 430 into the second position. In the example provided, the torsion spring 440 has a helically coiled portion that is received over the pivot pin 404 and disposed between two arms. An end of a first one of the arms is mounted to the bracket 424, while an end of the other one of the arms is mounted to the pawl body 430. A feature, such as a head or a washer, can be formed on or coupled to the pivot pin 404 to trap the helically coiled portion of the torsion spring 440 on the pivot pin 404 on a side of the bracket 424 that is opposite the park pawl 406.

The park-lock plunger assembly 408 can include a plunger 450, an input member 452 and a compliance spring 454. The plunger 450 is movable along an axis that is parallel to the motor axis 70 and has a generally cylindrical first plunger portion, a generally cylindrical second plunger portion and a transition portion that tapers between the first and second plunger portions. The first plunger portion has a first diameter, the second plunger portion is spaced apart from the first plunger portion and has a second, larger diameter, and the transition portion is disposed and tapers between the first and second plunger portions so that the transition portion has a frustoconical exterior surface. The plunger 450 can be translated between a first plunger position, in which the first plunger portion is in contact with the park pawl 406, and a second plunger position in which either the transition portion or the second plunger portion is in contact with the park pawl 406. The first plunger portion is sized so that the pawl body 430 of the park pawl 406 is disposed in the second position when the first plunger portion is engaged to (directly contacts) the pawl body 430. Translation of the plunger 450 from the first plunger position to the second plunger position causes relatively larger portions of the plunger 450 to contact the pawl body 430, which pivots the pawl body 430 toward the second pawl position.

The input member 452 is movable about the translation axis of the plunger 450 and can be moved in any desired manner. In the example provided, an electric park-lock motor 460 and a manual park-lock input lever 462 are provided as alternative or redundant inputs for the operation of the park-lock mechanism 400, while an output lever 464 is employed to coordinate movement of the input member 452. More specifically, the output lever 464 is coupled to the input member 452 and is pivotably coupled to the second housing member 32 for movement between a first input position and a second input position. The manual park-lock input lever 462 is fixedly coupled to a portion of the output lever 464 that extends through the second housing member 32 (i.e., so that the manual park-lock input lever 462 is disposed outside the gearcase). Pivoting motion of the manual park-lock input lever 462 about the pivot axis of the output lever 464 causes corresponding pivoting motion of the output lever 464 about the pivot axis of the output lever 464. The electric park-lock motor 460 is mounted to an exterior surface of the second housing member 32 and includes an output shaft 470 that extends into the transmission cavity 38. An intermediate lever 472 is coupled to the output shaft 470 of the electric park-lock motor 460 and can be moved by the electric park-lock motor 460 about the rotational axis of the output shaft 470 between a first intermediate lever position and a second intermediate lever position. An end of the intermediate lever 472 that is opposite the output shaft 470 includes a pin that is received into a slotted aperture in the output lever 464. Movement of the intermediate lever 472 from the first intermediate lever position to the second intermediate lever position (in response to rotation of the output shaft 470) causes pivoting motion of the output lever 464 about its pivot axis from the first input position to the second input position. The slotted aperture in the output lever 464 permits the output lever 464 to be moved about its pivot axis from the first input position to the second input position without corresponding motion of the intermediate lever 472.

The compliance spring 454 is disposed between the input member 452 and the plunger 450 and permits the pawl body 430 to push the plunger 450 away from the pawl body 430 when the output lever 464 is disposed in the second input position. It will be appreciated that placement of the output lever 464 in the second input position places the input member 452 into a position that would ordinarily position the plunger 450 in the second plunger position. However, in situations where the pawl member 432 is not able to drop into a valley 420 or remain in a valley 420, the park pawl 406 can translate the plunger 450 toward the compliance spring 454 to compress the compliance spring 454 so that the park-lock gear 402 is able to rotate.

Significant portions of both the actuator assembly 300 and the park-lock mechanism 400 can be assembled to the second housing member 32 before it is assembled to the first housing member 30 to close the transmission cavity 38 and the differential cavity 40. In this regard, all or portions of the reduction gearset (e.g., the actuator input gear 360 and the actuator output gear 362 in the example provided), the bearings 308 and 310, the lead screw 304, the torsionally resilient coupling (if included) and optionally the coupler 306 and/or the actuator motor 312 of the actuator assembly 300 can be installed to the second housing member 32 prior to the mounting of the second housing member 32 to the first housing member 30. Additionally or alternatively, all of the components of the park-lock mechanism 400 except for the park-lock gear 402 can be assembled to the second housing member 32 prior to the mounting of the second housing member 32 to the first housing member 30.

Figure 23:
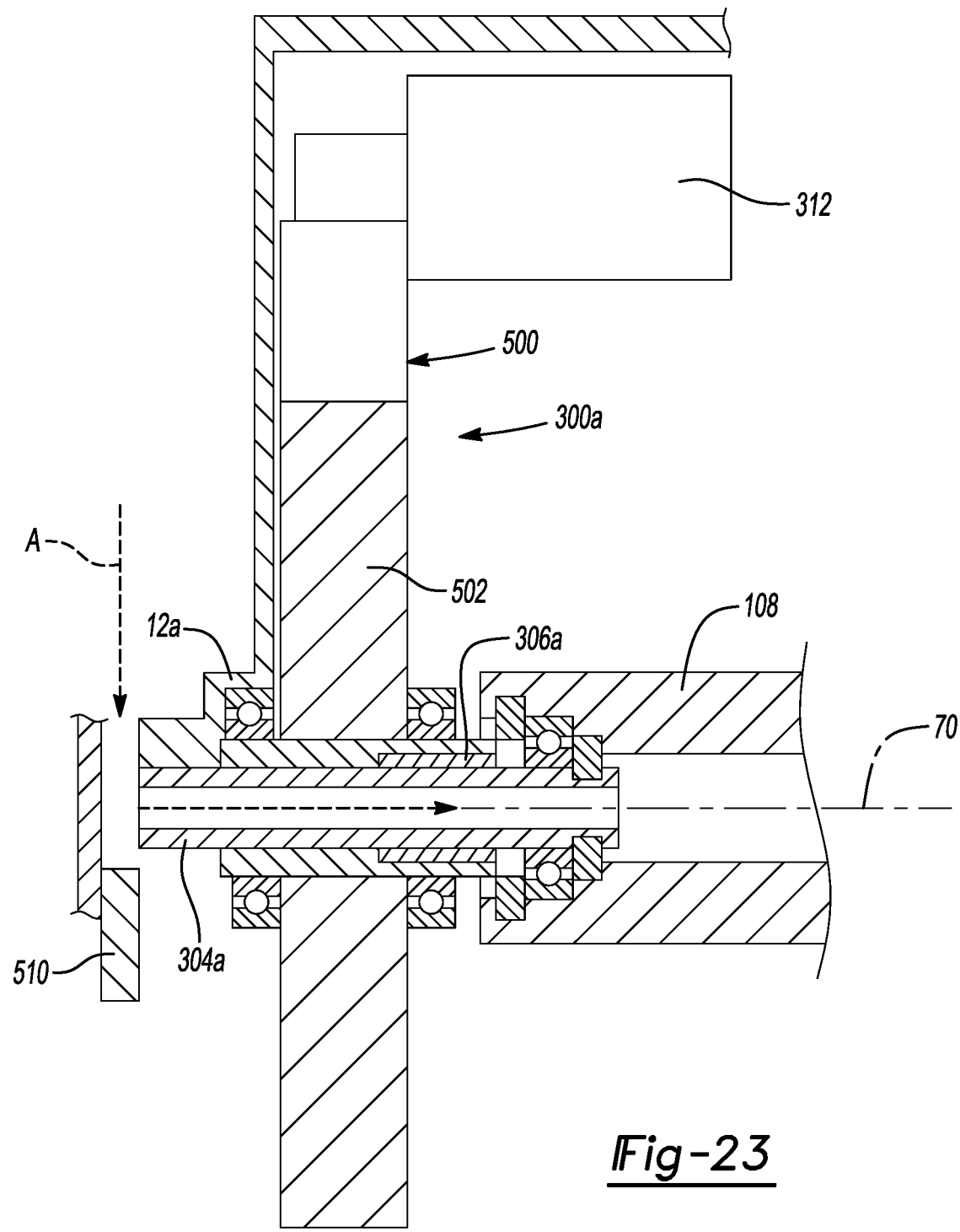
FIG. 23 is a schematic illustration of an alternately constructed actuator assembly.

With reference to FIG. 23, the actuator assembly 300a has an actuator transmission 500 that transmits rotary power between the actuator motor 312 and the coupler 306a. In this example, the lead screw 304a is non-rotatably but axially slidably coupled to the housing assembly 12a, and an actuator output gear 502 of the actuator transmission 500 is fixedly coupled to the coupler 306a. Accordingly, the actuator motor 312 can be operated to rotationally drive the actuator output gear 502. Since the coupler 306a is fixedly coupled to the actuator output gear 502 and threadably coupled to the lead screw 304a, rotation of the actuator output gear 502 causes corresponding rotation of the coupler 306a, which in turn causes translation of the lead screw 304a along the motor axis 70. The lead screw 304a can be coupled to the input shaft 108 in a manner that permits relative rotation but inhibits relative axial movement along the motor axis 70. In the example provided, a bearing 504 is mounted between the lead screw 304a and the input shaft 108. The bearing 504 is configured to transmit thrust loads along the motor axis 70 between the lead screw 304a and the input shaft 108 and can optionally rotationally support radial loads transmitted between the lead screw 304a and the input shaft 108. If desired, lubricating oil (represented by the arrow A) can be transmitted through the lead screw 304a into the hollow interior of the input shaft 108. Optionally, a sensor 510 can be mounted to the housing assembly 12 and can be configured to sense a position of the lead screw 304a along the motor axis 70 and responsively generate a sensor signal.

Figure 24:
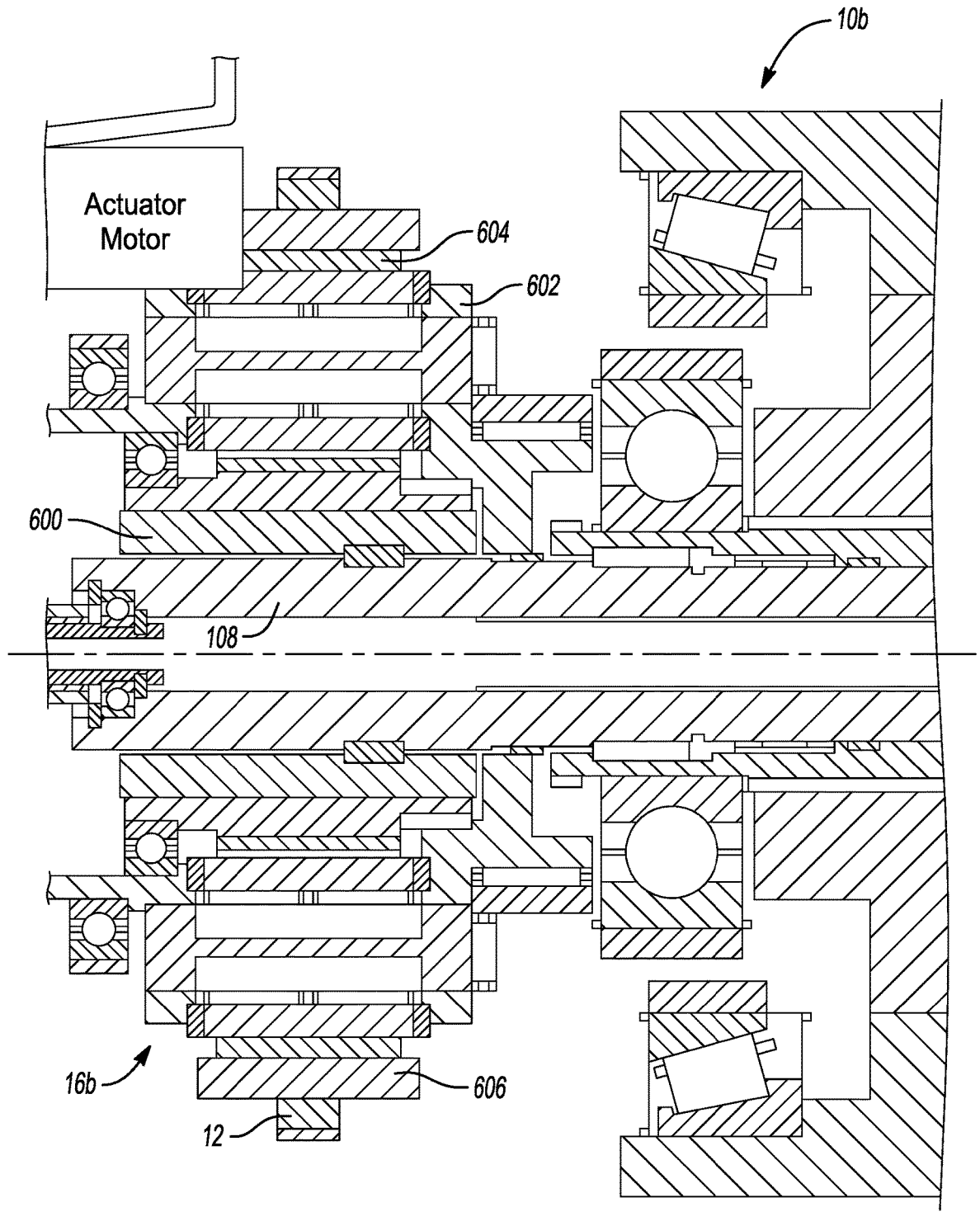
FIG. 24 is a schematic illustration of a portion of another constructed multi-speed electric drive axle illustrating an alternately constructed transmission.

In FIG. 24, a portion of another multi-speed electric drive axle 10b is illustrated. The transmission 16b of the multi-speed electric drive axle 10b is configured with a planetary configuration having a sun gear 600, a planet carrier 602, a plurality of planet gears 604 and a ring gear 606 that is fixedly coupled to the housing assembly 12. Each of the planet gears 604 can be a single gear that is journally supported by the planet carrier 602 and meshingly engaged to both the sun gear 600 and the ring gear 606. Alternatively, each of the planet gears 606 can comprise two or more gears that are meshed together and journally supported by the planet carrier 602, with one of the gears being meshingly engaged to sun gear 600 and another one of the gears being meshingly engaged to the ring gear 606. The input shaft 108 is slidable between a first position, in which the input shaft 108 is rotationally coupled only to the sun gear 600 so that the transmission 16b operates in a first speed ratio, and a second position in which the input shaft 108 is rotationally coupled to both the sun gear 600 and the planet carrier 602 so that the transmission 16b operates in a second speed ratio that is different from the first speed ratio.

In the example of FIG. 25, the transmission 16d includes an auxiliary reduction stage 698 comprises first and second intermediate gears 700 and 702, respectively, and a layshaft gear pair having a first layshaft gear 704, which is meshingly engaged with the first intermediate gear 700, and a second layshaft gear 706 that is coupled to the first layshaft gear 704 for rotation therewith and meshingly engaged with the second intermediate gear 702. The first and second intermediate gears 700 and 702 are rotatably mounted on the input shaft 108, a mating spline portion 714 is formed on the first intermediate gear 700 and a mating spline portion 712 is formed on the second intermediate gear 702.

When the input shaft 108 is positioned in the first position, a spline portion 720 on the motor output shaft 72 is engaged with a spline portion 730 formed on the input shaft 108 to thereby rotatably couple the input shaft 108 to the motor output shaft 72, another spline portion 732 on the input shaft 108 is engaged with a mating spline portion 742 on a first drive gear 744 to thereby rotatably couple the first drive gear 744 to the input shaft 108, a spline portion 750 on the input shaft 108, the spline portion 750 on the input shaft 108 is disengaged from the mating spline portion 714 of the first intermediate gear 700, and the spline portion 752 on a coupling sleeve 754 is engaged only with the mating spline portion 712 of the second intermediate gear 702. Consequently, the auxiliary reduction stage 698 is not employed in the transmission of rotary power between the electric motor 14 and the differential assembly 18. It will be appreciated that while the spline portion 752 on the coupling sleeve 754 is engaged to the mating spline portion 712 of the second intermediate gear 702, no rotary power is transmitted between the second intermediate gear 702 and the input shaft 108 because the coupling sleeve 754 is rotatable relative to the input shaft 108. It will be appreciated that the first drive gear 744 is meshingly engaged to an intermediate gear 744a that is fixed to a layshaft, that a layshaft output gear that is fixedly coupled to the layshaft and meshingly engaged with an output gear that is coupled to the differential input member 230 for common rotation.

Movement of the input shaft 108 from the first position to the second position disengages the spline portion 732 on the input shaft 108 from the mating spline portion 742 on the drive gear 744 but leaves the spline portion 720 on the motor output shaft 72 engaged with the mating spline portion 730 on the input shaft 108, the spline portion 750 on the input shaft 108 disengaged from the mating spline portion 714 of the first intermediate gear 700, and the spline portion 752 on a coupling sleeve 754 is only engaged to the mating spline portion 712 of the second intermediate gear 702. In this position, no rotary power is transmitted between the drive gear 744 and the motor output shaft 72 and as such, the transmission 16d operates in a "neutral" condition so that rotary power is not transmitted between the differential input member 230 and the motor output shaft 72.

Movement of the input shaft 108 from the second position to the third position engages the spline portion 750 on the input shaft 108 to the mating spline portion 714 of the first intermediate gear 700 and engages the spline portion 752 on a coupling sleeve 754 to the mating spline portion 760 on the second drive gear 762, while leaving the spline portion 720 on the motor output shaft 72 engaged with the mating spline portion 730 on the input shaft 108, the spline portion 732 on the input shaft 108 disengaged from the mating spline portion 742 on the drive gear 744, and the spline portion 752 on a coupling sleeve 754 engaged with the mating spline portion 712 of the second intermediate gear 702. In this position, rotary power provided by the motor output shaft 72 is transmitted to the first intermediate gear 700 (via the spline portion 750 on the input shaft 108 and the mating spline portion 714 of the first intermediate gear 700). The auxiliary reduction stage 698 performs a speed reduction and torque multiplication function a first speed reduction and torque multiplication function is provided by the first intermediate gear 200 and the first layshaft gear 204, and a second speed reduction and torque multiplication function is provided by the second layshaft gear 206 and the second intermediate gear 702. The coupling sleeve 754 rotatably couples the second intermediate gear 702 to the second drive gear 762 to drive the second drive gear 762 about the motor axis 70. It will be appreciated that when the input shaft 108 is positioned in the third position, the second drive gear 762 is driven at a reduced speed relative to the rotational speed of the first drive gear 744 when the input shaft 108 is in the first position because the auxiliary reduction stage 698 is actively employed in the transmission of rotary power between the motor output shaft 72 and the differential assembly 18 when the input shaft 108 is in the third position (i.e., the second drive gear 762 is operated at a reduced rotational speed relative to the rotational speed of the motor output shaft 72 due to the speed reduction that is provided by the auxiliary reduction stage 698). It will be appreciated that the second drive gear 762 is drivingly engaged to another intermediate gear 762a that is fixed to the layshaft to thereby drive the layshaft and the layshaft output gear.

It will be appreciated that the first intermediate input gear 744, the second intermediate input gear 700, the third intermediate gear 702 and the fourth intermediate gear 762 are coaxial with the input shaft 108 and are rotatable relative to the input shaft 108 in at least one of a first speed ratio and a second speed ratio. Additionally, the input shaft 108 is axially movable along the motor axis 70 between a first position, in which a first one of the at least three on-axis gears (i.e., first intermediate input gear 744, the second intermediate input gear 700, the third intermediate gear 702 and the fourth intermediate gear 762) is rotationally coupled to the input shaft 108, and a second position in which a second, different one of the at least three on-axis gears is rotationally coupled to the input shaft.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive axle comprising:
   a housing assembly;
   an electric motor coupled to the housing assembly and having a motor shaft that is rotatable about a motor axis;
   a differential assembly received in the housing assembly, the differential assembly having a differential input member, which is rotatable about an output axis, and a pair of differential output members that are rotatable about the output axis; and
   a transmission received in the housing assembly and transmitting rotary power between the motor shaft and the differential input member, the transmission having a multi-speed reduction that includes an input shaft, which is rotatably coupled to the motor shaft and axially movable along the motor axis, a reduction gearset, an output gear and a coupling sleeve, the reduction gearset having an intermediate input gear and an intermediate output gear, the coupling sleeve being coaxially disposed on the input shaft, the coupling sleeve being axially fixed to but rotatable about the input shaft, the input shaft being movable along the motor axis between a first position, in which the output gear is coupled to the input shaft for rotation therewith, and a second position, in which the intermediate input gear is coupled to the input shaft for rotation therewith, wherein the coupling sleeve rotatably couples the intermediate output gear to the output gear when the input shaft is in the second position.

2. The electric drive axle of claim 1, wherein the input shaft is movable along the output axis into a neutral position between the first and second positions, wherein the coupling sleeve is rotatably decoupled from the intermediate output gear and the input shaft is rotatably decoupled from both the intermediate input gear and the output gear when the input shaft is in the neutral position.

3. The electric drive axle of claim 1, wherein the transmission further includes a single-speed portion having a transmission output gear that is rotatably coupled to the differential input member, the single-speed portion receiving rotary power from the output gear of the multi-speed reduction.

4. The electric drive axle of claim 3, wherein the single-speed portion includes a first intermediate gear, which is meshingly engaged to the output gear of the multi-speed reduction, and a second intermediate gear, which is coupled to the first intermediate gear for rotation therewith, the second intermediate gear being meshingly engaged with the transmission output gear.

5. The electric drive axle of claim 4, wherein the single-speed portion includes a third intermediate gear, which is meshingly engaged to the output gear of the multi-speed reduction, and a fourth intermediate gear, which is coupled to the third intermediate gear for rotation therewith, the fourth intermediate gear being meshingly engaged with the transmission output gear.

6. The electric drive axle of claim 1, further comprising an actuator assembly having an axially movable member, the input shaft being axially fixed but rotatable relative to the axially movable member.

7. The electric drive axle of claim 6, wherein the actuator assembly includes at least one bearing that is disposed between the input shaft and the axially movable member.

8. The electric drive axle of claim 7, wherein the at least one bearing comprises a pair of thrust bearings.

9. The electric drive axle of claim 6, wherein the actuator assembly includes an actuator having an actuator motor, a screw that is driven by the actuator motor and a coupler that is threadably coupled to the screw and engaged to the axially movable member.

10. The electric drive axle of claim 9, wherein a pocket is formed in the axially movable member and wherein a portion of the coupler is received into the pocket to couple the axially movable member to the coupler for movement therewith along a rotational axis of the screw.

11. The electric drive axle of claim 10, wherein the pocket and the portion of the coupler have mating non-circular cross-sectional shapes taken in a direction that is perpendicular to the rotational axis of the screw.

12. The electric drive axle of claim 1, wherein the intermediate input gear has a first set of internal splines, wherein the intermediate output gear has a second set of internal splines, wherein the output gear has a third set of internal splines, wherein the input shaft has a first set of external splines that are engagable with the first set of internal splines to rotatably couple the input gear and the input shaft together, wherein the coupling sleeve has a second set of external splines that are meshingly engaged with the second set of internal splines to rotatably couple the coupling sleeve and the intermediate output gear to one another, and wherein the input shaft has a third set of external splines that are engagable to the third set of internal splines to rotationally couple the input shaft to the output gear.

13. The electric drive axle of claim 1, wherein the output gear has a first set of engagement features and wherein the coupling sleeve has a second set of engagement features that are engagable with the first set of engagement features to rotatably couple the coupling sleeve to the output gear.

14. The electric drive axle of claim 13, wherein the first and second sets of engagement features comprise face teeth.

15. The electric drive axle of claim 1, wherein the housing assembly includes a carrier housing and a pair of axle tubes, wherein the carrier housing is formed by a pair of housing members that are joined to one another across a plane that is transverse to the output axis, each of the housing members defining an axle tube mount, each of the axle tubes being received into a corresponding one of the axle tube mounts.

16. The electric drive axle of claim 1, further comprising a pair of wheel hubs and a pair of axle shafts, each of the wheel hubs being rotatably mounted on the housing assembly, each of the axle shafts rotationally coupling one of the differential output members to a corresponding one of the wheel hubs.

17. The electric drive axle of claim 1, further comprising an actuator assembly having an actuator motor, a screw, which is non-rotatably but axially slidably coupled to the housing assembly, a coupler that is threadably coupled to the screw, an actuator transmission that transmits rotary power between the actuator motor and the coupler, the actuator transmission having an actuator output gear that is driven by the actuator motor and which is rotatable about a longitudinal axis of the screw, the coupler being fixedly coupled to the actuator output gear.

18. An electric drive axle comprising:
a housing assembly;
an electric motor coupled to the housing assembly and having a motor shaft that is rotatable about a motor axis;
a differential assembly received in the housing assembly, the differential assembly having a differential input member, which is rotatable about an output axis, and a pair of differential output members that are rotatable about the output axis; and
a transmission received in the housing assembly and transmitting rotary power between the motor shaft and the differential input member, the transmission having an input shaft, which is rotatably coupled to the motor shaft and axially movable along the motor axis, a first reduction gearset, a second reduction gearset, and a coupling sleeve, the first reduction gearset having a first intermediate input gear and a first intermediate output gear, the first intermediate output gear being axially slidably and rotatably disposed on the input shaft, the first intermediate output gear being meshingly engaged with the first intermediate input gear and being rotatable about an intermediate axis that is parallel to the motor axis, the second reduction gearset having a second intermediate input gear, a second intermediate output gear, a first intermediate gear, a second intermediate gear, a third intermediate gear and a fourth intermediate gear, the input shaft being rotatable and axially slidable relative to the second intermediate input gear, the third intermediate gear and the fourth intermediate gear, the first intermediate gear being meshingly engaged to the second intermediate input gear, the second intermediate gear being coupled to the first intermediate gear for rotation therewith and meshingly engaged to the third intermediate gear, the fourth intermediate gear being meshingly engaged to the second intermediate output gear, the coupling sleeve being rotatable about the input shaft but being coupled to the input shaft for translation therewith along the motor axis, wherein the input shaft is movable between a first position, in which the input shaft is rotatably coupled to the first intermediate input gear and the coupling sleeve is rotationally decoupled from at least one of the third intermediate gear and the fourth intermediate gear, and a second position in which the input shaft is rotationally decoupled from the first intermediate input gear, the input shaft is rotationally coupled to the second intermediate input gear, and the coupling sleeve rotationally couples the third and fourth intermediate gears to one another.

* * * * *